US010641525B2

(12) United States Patent
Iwamura et al.

(10) Patent No.: US 10,641,525 B2
(45) Date of Patent: May 5, 2020

(54) HEAT GENERATING SYSTEM

(71) Applicant: CLEAN PLANET Inc., Tokyo (JP)

(72) Inventors: Yasuhiro Iwamura, Sendai (JP); Takehiko Ito, Tokyo (JP); Jirota Kasagi, Sendai (JP); Hideki Yoshino, Tokyo (JP); Masanao Hattori, Tokyo (JP)

(73) Assignee: CLEAN PLANET Inc., Tokyo (JP)

( * ) Notice: Subject to any disclaimer, the term of this patent is extended or adjusted under 35 U.S.C. 154(b) by 54 days.

(21) Appl. No.: 15/766,306

(22) PCT Filed: Dec. 12, 2016

(86) PCT No.: PCT/JP2016/086878
§ 371 (c)(1),
(2) Date: Apr. 5, 2018

(87) PCT Pub. No.: WO2017/104602
PCT Pub. Date: Jun. 22, 2017

(65) Prior Publication Data
US 2018/0306468 A1    Oct. 25, 2018

(30) Foreign Application Priority Data
Dec. 15, 2015   (JP) .................................. 2015-243890

(51) Int. Cl.
*F24V 30/00* (2018.01)
*F17C 11/00* (2006.01)
*F17C 13/02* (2006.01)

(52) U.S. Cl.
CPC .............. *F24V 30/00* (2018.05); *F17C 11/00* (2013.01); *F17C 11/005* (2013.01); *F17C 13/026* (2013.01); *F17C 2205/0142* (2013.01)

(58) Field of Classification Search
None
See application file for complete search history.

(56) References Cited

U.S. PATENT DOCUMENTS

| | | | |
|---|---|---|---|
| 2002/0170976 A1* | 11/2002 | Bergh | B01J 19/0046 236/49.1 |
| 2003/0053579 A1* | 3/2003 | Waisman | G21B 3/00 376/100 |

(Continued)

FOREIGN PATENT DOCUMENTS

| JP | S63-129264 A | 6/1988 |
|---|---|---|
| JP | H06130168 A | 5/1994 |

(Continued)

OTHER PUBLICATIONS

English translation of Ishizawa reference.*
(Continued)

*Primary Examiner* — Jason Lau
(74) *Attorney, Agent, or Firm* — Muncy, Geissler, Olds & Lowe, P.C.

(57) ABSTRACT

A heat generating system (1) of the present invention controls an excess heat output from heat-generating element cells (16) that are generating excess heat as a result of the heat generation reaction among the plurality of heat-generating element cells (16) by increasing the number of heat generation reaction positions, and therefore even if the other heat-generating element cells (16) do not generate excess heat due to insufficient heat generation reaction, the heat-generating element cells (16) in which the heat generation reaction is certainly occurring can compensate for insufficient amount of heat to be recovered, thereby capable of stably obtaining heat using the heat-generating element cells (16) each of which generates heat using a hydrogen storage metal or a hydrogen storage alloy.

11 Claims, 8 Drawing Sheets

(56) References Cited

U.S. PATENT DOCUMENTS

2011/0135543 A1* 6/2011 Tatarchuk ............ B01J 19/2405
422/198
2016/0155518 A1 6/2016 Mizuno

FOREIGN PATENT DOCUMENTS

| JP | H08-277101 A | 10/1996 |
| --- | --- | --- |
| JP | 2000-111194 A | 4/2000 |
| JP | 2002-160901 A | 6/2002 |
| JP | 2002228098 A | 8/2002 |
| JP | 2005-090759 A | 4/2005 |
| JP | 2008-045648 A | 2/2008 |
| JP | 2009-264448 A | 11/2009 |
| WO | 2015-008859 A2 | 1/2015 |

OTHER PUBLICATIONS

Office Action of the corresponding KR application No. 10-2018-7011929 dispatched Dec. 3, 2018 and English translation thereof.

A. Kitamura, et al., "Anomalous effects in charging of Pd powders with high density hydrogen isotopes", Physics Letters A 373 (2009) 3109-3112.

A. Kitamura, et al., "Brief summary of latest experimental results with a mass-flow calorimetry system for anomalous heat effect of nanocomposite metals under D(H)-gas charging" Current Science, vol. 108, No. 4, p. 589-593, 2015.

Y. Iwamura, T. Itoh, N. Gotoh and I. Toyoda, Fusion Technology, vol. 33, p. 476-492, 1998.

I. Dardik, et al., "Ultrasonically-excited electrolysis Experiments at Energetics Technologies", ICCF-14 International Conference on Condensed Matter Nuclear Science. 2008. Washington, DC.

Y. Arata and Yue-Chang Zhang, "Anomalous Difference between Reaction Energies Generated within D2O-Cell and H2O-Cell", Jpn. J. Appl. Phys. vol. 37 (1998) pp. L 1274-L 1276.

F. Celani et al., "Improved understanding of self-sustained, sub-micrometric multicomposition surface Constantan wires interacting with H2 at high temperatures: experimental evidence of Anomalous Heat Effects", Chemistry and Materials Research, vol. 3 No. 12 (2013) 21.

* cited by examiner

HEAT GENERATING SYSTEM

TECHNICAL FIELD

The present invention relates to a heat generating system.

BACKGROUND ART

Recently, it has been announced that a heat generation reaction occurs when an inside of a container provided with heat-generating elements made of palladium (Pd) is supplied with deuterium gas and heated (for example, see Non Patent Literature 1 and Non Patent Literature 2).

The detailed mechanism of a heat generation phenomenon of generating excess heat (output enthalpy higher than input enthalpy) using a hydrogen storage metal such as palladium (Pd) or a hydrogen storage alloy such as palladium alloy has been discussed among researchers of each country. For example, it is also reported in Non Patent Literatures 3 to 6 that a heat generation phenomenon has occurred, and it can be said the heat generation phenomenon is an actually occurring physical phenomenon. Since this heat generation phenomenon causes excess heat generation, the excess heat can be used as an effective heat source if the heat generation phenomenon can be controlled.

CITATION LIST

Non Patent Literature

Non Patent Literature 1: A. Kitamura, et al., "Anomalous effects in charging of Pd powders with high density hydrogen isotopes", Physics Letters A 373 (2009) 3109-3112

Non Patent Literature 2: A. Kitamura, et al., "Brief summary of latest experimental results with a mass-flow calorimetry system for anomalous heat effect of nano-composite metals under D(H)-gas charging" CURRENT SCIENCE, VOL. 108, NO. 4, p. 589-593, 2015

Non Patent Literature 3: Y. Iwamura, T. Itoh, N. Gotoh and I. Toyoda, Fusion Technology, Vol. 33, p. 476-492, 1998.

Non Patent Literature 4: I. Dardik, et al., "Ultrasonically-excited electrolysis Experiments at Energetics Technologies", ICCF-14 International Conference on Condensed Matter Nuclear Science. 2008. Washington, D.C.

Non Patent Literature 5: Y. ARATA and Yue-Chang ZHANG, "Anomalous Difference between Reaction Energies Generated within $D_2O$-Cell and $H_2O$-Cell", Jpn. J. Appl. Phys. Vol. 37 (1998) pp. L 1274-L 1276

Non Patent Literature 6: F. Celani et al., "Improved understanding of self-sustained, sub-micrometric multicomposition surface Constantan wires interacting with $H_2$ at high temperatures: experimental evidence of Anomalous Heat Effects", Chemistry and Materials Research, Vol. 3 No. 12 (2013) 21

SUMMARY OF INVENTION

Technical Problem

In a heat-generating element cell using technologies disclosed Non Patent Literatures 1 to 6 in which heat is generated using a hydrogen storage metal or a hydrogen storage alloy, sometimes the occurrence probability of heat generation phenomenon is low. Even if the heat-generating element cell generates excess heat once, a phenomenon may occur in which the excess heat is suddenly reduced by some cause. These cause a problem that the expected heat cannot be necessarily stably obtained.

The present invention has been made in view of the above problem, and an object of the present invention is to propose a heat generating system capable of stably obtaining heat using the above-described heat-generating element cell that may unstably generate the heat using a hydrogen storage metal or a hydrogen storage alloy.

Solution to Problem

To solve the above-described problem, a heat generating system of the present invention includes: a plurality of heat-generating element cells each of which generates excess heat using a hydrogen storage metal or a hydrogen storage alloy when hydrogen-based gas contributing to heat generation is supplied into a container; and an integrated control unit that controls the heat generation by heating each of the heat-generating element cells and supplying the hydrogen-based gas into each of the heat-generating element cells, and makes an output recovery unit recover excess heat output from each of the heat-generating element cells. The integrated control unit controls the heat generation of the heat-generating element cell that is not generating excess heat, and further controls an excess heat output of the other heat-generating element cell that is generating excess heat by performing at least any of temperature adjustment of the heat-generating element cell, supply control of the hydrogen-based gas into the heat-generating element cell, and pressure control in the heat-generating element cell, thereby increasing and/or maintaining the excess heat output from the heat-generating element cell.

A heat generating system of the present invention includes: a plurality of heat-generating element cells each of which generates excess heat using a hydrogen storage metal or a hydrogen storage alloy when hydrogen-based gas contributing to heat generation is supplied into a container; and an integrated control unit that controls the heat generation by heating each of the heat-generating element cells and supplying the hydrogen-based gas into each of the heat-generating element cells, and makes an output recovery unit recover excess heat output from each of the heat-generating element cells. The integrated control unit controls the heat generation of the heat-generating element cell that is generating excess heat, and further controls an excess heat output of the other heat-generating element cell that is not generating excess heat by performing at least any of temperature adjustment of the heat-generating element cell, supply control of the hydrogen-based gas into the heat-generating element cell, and pressure control in the heat-generating element cell, thereby promoting the excess heat output from the heat-generating element cell.

A heat generating system of the present invention includes: a plurality of heat-generating element cells each of which generates excess heat using a hydrogen storage metal or a hydrogen storage alloy when an electrolytic solution contributing to heat generation is supplied into a container; and an integrated control unit that controls the heat generation by heating each of the heat-generating element cells and supplying the electrolytic solution into each of the heat-generating element cells, and makes an output recovery unit recover excess heat output from each of the heat-generating element cells. The integrated control unit controls the heat generation of the heat-generating element cell that is not generating excess heat, and further controls an excess heat output of the other heat-generating element cell that is generating excess heat by performing at least any of temperature adjustment of the heat-generating element cell, supply control of the electrolytic solution into the heat-generating element cell, and electrolytic voltage and current control in the heat-generating element cell, thereby increasing and/or maintaining the excess heat output from the heat-generating element cell.

A heat generating system of the present invention includes: a plurality of heat-generating element cells each of which generates excess heat using a hydrogen storage metal or a hydrogen storage alloy when an electrolytic solution contributing to heat generation is supplied into a container; and an integrated control unit that controls the heat generation by heating each of the heat-generating element cells and supplying the electrolytic solution into each of the heat-generating element cells, and makes an output recovery unit recover excess heat output from each of the heat-generating element cells. The integrated control unit controls the heat generation of the heat-generating element cell that is generating excess heat, and further controls an excess heat output of the other heat-generating element cell that is not generating excess heat by performing at least any of temperature adjustment of the heat-generating element cell, supply control of the electrolytic solution into the heat-generating element cell, and electrolytic voltage and current control in the heat-generating element cell, thereby promoting the excess heat output from the heat-generating element cell.

A heat generating system of the present invention includes: a heat-generating element cell that generates heat using a hydrogen storage metal or a hydrogen storage alloy when hydrogen-based gas contributing to heat generation is supplied into the heat-generating element cell; a temperature measurement unit that is provided to the heat-generating element cell, and measures a temperature of an inside and/or an outer wall of a container of the heat-generating element cell; a gas supply control unit that determines a supply position of the hydrogen-based gas to be supplied into the heat-generating element cell based on a measurement result obtained from the temperature measurement unit; and a gas supply change unit that changes a supply position of the hydrogen-based gas to be supplied into the heat generating element cell to a supply position determined by the gas supply control unit.

Advantageous Effect(s) of Invention

According to the present invention, the heat generating system controls the excess heat output from each of the heat-generating element cells that generate excess heat as a result of the heat generation reaction among the plurality of heat-generating element cells, in order to increase and/or maintain the excess heat output, and therefore even if the other heat-generating element cells do not generate excess heat due to insufficient heat generation reaction, the heat-generating element cells that are generating excess heat can compensate for insufficient amount of heat to be recovered, thereby capable of stably obtaining heat using the heat-generating element cells each of which generates heat using a hydrogen storage metal or a hydrogen storage alloy.

According to the present invention, even if some heat-generating element cells do not generate excess heat due to insufficient heat generation reaction among the plurality of heat-generating element cells, the heat generating system, as the excess heat output control, tries to generate the heat generation reaction to the heat-generating element cells that is not generating excess heat to promote the excess heat output, and further can control so that the heat-generating element cells that are generating excess heat compensate for insufficient amount of heat to be recovered, thereby capable of stably obtaining heat using the heat-generating element cells each of which generates heat using a hydrogen storage metal or a hydrogen storage alloy.

According to the present invention, the supply position of the hydrogen-based gas to be supplied into the heat-generating element cell is properly changed in accordance with a heat generation state of the heat-generating element cell that changes together with the elapse of time so that the excess heat is output, thereby capable of stably obtaining heat using the heat-generating element cell that generates heat using a hydrogen storage metal or a hydrogen storage alloy.

DESCRIPTION OF EMBODIMENTS

Embodiments of the present invention will be described in detail based on the following drawings.

(1) Entire Configuration of Heat Generating System of the Present Invention

Figure 1:
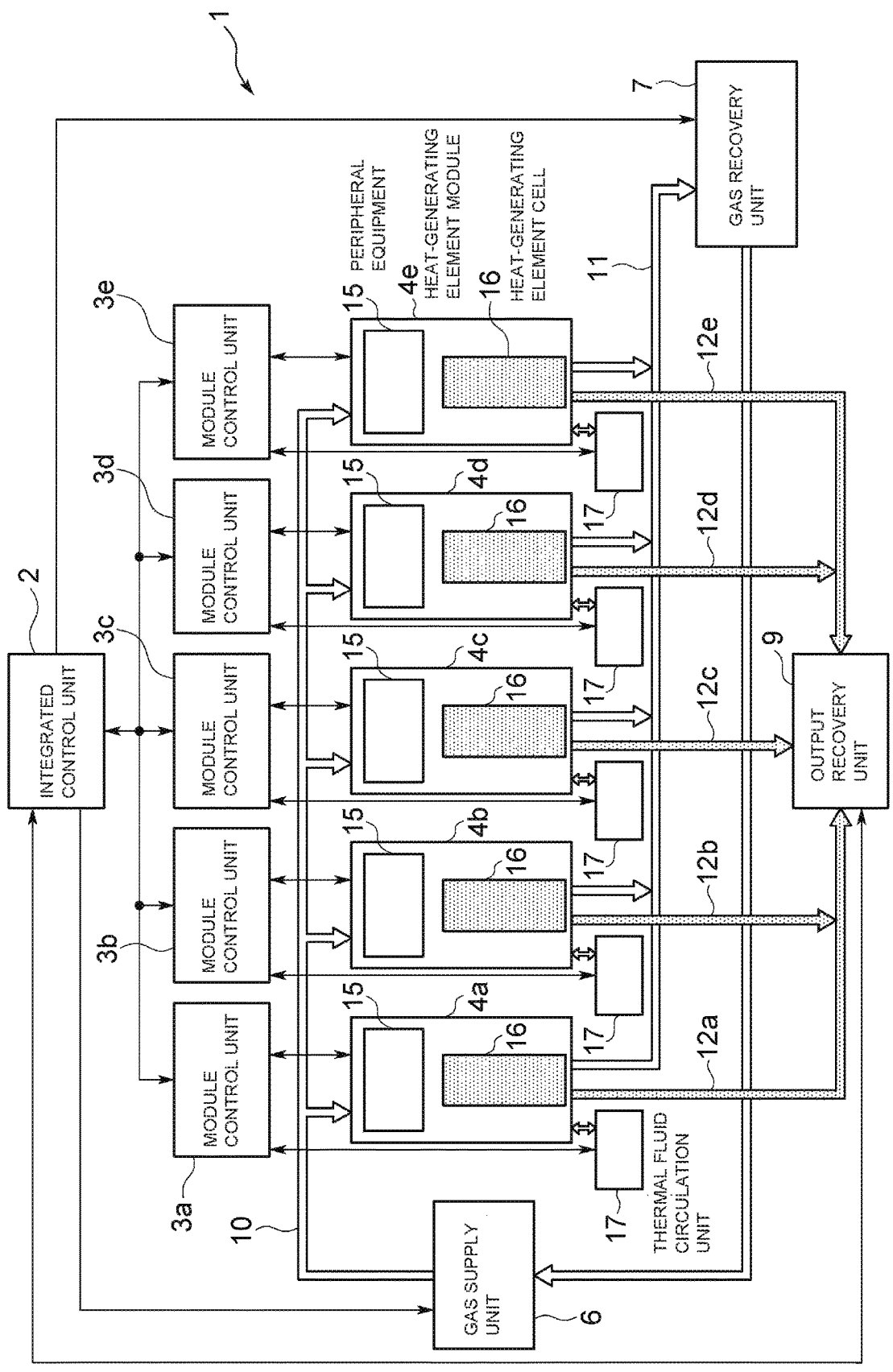
FIG. 1 is a schematic diagram illustrating an entire configuration of a heat generating system according to the present invention.

As illustrated in FIG. 1, a heat generating system 1 of the present invention includes an integrated control unit 2 with a microcomputer configuration including a CPU (Central Processing Unit), a RAM (Random Access Memory), a ROM (Read Only Memory), and the like that are not illustrated. The heat generating system 1 has a configuration in which the integrated control unit 2 is connected to: module control units 3a, 3b, 3c, 3d, 3e that control heat-generating element modules 4a, 4b, 4c, 4d, 4e, respectively; a gas supply unit 6 that supplies hydrogen-based gas contributing to heat generation of a heat-generating element cells 16 into each of the heat-generating element modules 4a, 4b, 4c, 4d, 4e through a pipe 10; a gas recovery unit 7 that recovers the hydrogen-based gas from each of the heat-generating element modules 4a, 4b, 4c, 4d, 4e through a pipe 11 and feeds it to the gas supply unit 6 again; a thermal fluid circulation unit 17 that is provided to each of the heat-generating element modules 4a, 4b, 4c, 4d, 4e; and an output recovery unit 9 that recovers the heat output from each of the heat-generating element modules 4a, 4b, 4c, 4d, 4e through pipes 12a, 12b, 12c, 12d, 12e, respectively.

The present embodiment describes a case in which since one heat-generating element cell 16 is provided in each of the heat-generating element modules 4a, 4b, 4c, 4d, 4e, a total of five heat-generating element cells 16 are provided as a plurality of heat-generating element cells, but the present invention is not limited thereto. Two, three, ten, or other various numbers of heat-generating element cells may be applied.

The integrated control unit 2 totally may control the module control units 3a, 3b, 3c, 3d, 3e that are provided to the heat-generating element modules 4a, 4b, 4c, 4d, 4e, the gas supply unit 6, the gas recovery unit 7, the thermal fluid circulation units 17, and the output recovery unit 9, and operate the entire heat generating system 1 so that the heat recovery amount at the output recovery unit 9 is the largest in the entire heat generating system 1.

The heat-generating element cell 16 placed in each of the heat-generating element modules 4a, 4b, 4c, 4d, 4e has a container in which a hydrogen storage metal such as Pd, Ni, Pt, and Ti, or a hydrogen storage alloy containing at least one of these elements is provided. When an interior of the container is supplied with hydrogen-based gas and heated, the heat generation reaction occurs, thereby generating excess heat.

Specifically, the heat-generating element cell 16 is a heat-generating element cell using technologies that are disclosed in Non Patent Literature 1, Non Patent Literature 2, Non Patent Literature 6, and International Publication No. WO 2015/008859. A detailed configuration of an internal structure is disclosed in Non Patent Literatures 1, 2, 6 and International Publication No. WO 2015/008859, and thus the description thereof is duplicated and omitted.

Note that the present embodiment describes a case in which the heat-generating element cell disclosed in Non Patent Literatures 1, 2, 6 and International Publication No. WO 2015/008859 is used as the heat-generating element cell that generates excess heat using the hydrogen storage metal or the hydrogen storage alloy when the hydrogen-based gas contributing to the heat generation is supplied into the container, but the present invention is not limited thereto. If excess heat can be generated using the hydrogen storage metal or the hydrogen storage alloy when the hydrogen-based gas contributing to the heat generation is supplied into the container, any configuration disclosed in the other various Non Patent Literatures and Patent Literatures may be used as the heat-generating element cell.

The heat-generating element cell 16 assumes that excess heat is generated in the heat-generating element cell 16 by performing the heat generation control through each of the heat-generating element modules 4a, 4b, 4c, 4d, 4e. However, in some heat-generating element cells 16, the heat generation reaction becomes sometimes unstable by some cause, and some heat-generating element cells may not generate excess heat.

As for the heat-generating element cells that do not generate excess heat, the heat generation reaction does not occur though optimal heat generation control is performed, of which the cause is sometimes unclear. Even if the supply control of the hydrogen-based gas is changed at that point, the heat generation reaction may be difficult to occur.

The heat generating system 1 according to the present invention, while continuously controlling the heat generation of the heat-generating element cell 16 that is not generating excess heat, controls the excess heat output of the heat-generating element cell 16 that is generating excess heat by performing temperature adjustment of the heat-generating element cell, supply control of the hydrogen-based gas, pressure control in the heat-generating element cell or the like, the excess heat output control being different from the heat generation control, thereby increasing and/or maintaining the excess heat output from the heat-generating element cell so that the heat-generating element cell 16 that is generating excess heat activates the heat generation reaction to compensates for insufficient amount of heat that may be generated by the heat-generating element cell 16 that is not generating excess heat.

In the present embodiment, the module control units 3a, 3b, 3c, 3d, 3e and the heat-generating element modules 4a, 4b, 4c, 4d, 4e have the same configurations, respectively. Therefore, the module control unit 3a and the heat-generating element module 4a will be described below.

The hydrogen-based gas as fluid contributing to the heat generation is heavy water gas, deuterium gas, light hydrogen gas, or light water gas, and may be properly changed in accordance with a type of heat-generating element cell 16 placed in each of the heat-generating element modules 4a, 4b, 4c, 4d, 4e.

The gas supply unit 6 supplies the hydrogen-based gas in a storage tank (not illustrated) and the hydrogen-based gas received from the gas recovery unit 7 to each of the heat-generating element modules 4a, 4b, 4c, 4d, 4e in accordance with an instruction from the integrated control unit 2. In the heat-generating element module 4a, peripheral equipment 15 performs amount control of the hydrogen-based gas supplied to the heat-generating element cell 16, selection of a supply position (height position) at which the hydrogen-based gas is supplied in the heat-generating element cell 16, pressure control in the heat-generating element cell 16, heating temperature control of the heat-generating element cell 16, and the like in accordance with an instruction from the module control unit 3a, in order to control the heat generation so that the heat-generating element cell 16 generates excess heat.

In the present embodiment, the module control unit 3a receives an instruction determined by the integrated control unit 2 in accordance with the heat generation states of the heat-generating element cells 16 in the other heat-generating element modules 4b, 4c, 4d, 4e, and makes the heat-generating element module 4a to be controlled perform a predetermined operation with accordance with an instruction from the integrated control unit 2.

The peripheral equipment 15 provided in the heat-generating element module 4a supplies the hydrogen-based gas supplied from the gas supply unit 6 into the heat-generating element cell 16 by a supply method in accordance with the instruction from the module control unit 3a. The peripheral equipment 15 feeds the hydrogen-based gas used in the heat-generating element cell 16 from the inside of the heat-generating element cell 16 to the gas recovery unit 7 to circulate the hydrogen-based gas in the heat-generating element cell 16. Note that the peripheral equipment 15 obtains an analysis result of gas generated in the heat-generating element cell 16 and transmits it as analysis data to the corresponding module control unit 3a, for example.

When supplying the hydrogen-based gas into the heat-generating element cell 16, the peripheral equipment 15, for example, controls a temperature of the hydrogen-based gas to heat the inside of the heat-generating element cell 16 and adjust the temperature in the heat-generating element cell 16, thereby promoting the heat generation in the heat-generating element cell 16.

In addition, the peripheral equipment 15 recovers the heat generated from a container outer wall of the heat-generating element cell 16 through thermal fluid, recovers the heat from the hydrogen-based gas discharged from the inside of the heat-generating element cell 16, and outputs the heat to the output recovery unit. At this time, the peripheral equipment 15 transmits the heat output from the heat-generating element cell 16 as output data to the corresponding module control unit. The module control unit 3a grasps how much amount of heat is output from the heat-generating element cell 16 based on the output data, and transmits the output data to the upper-layer integrated control unit 2. The integrated control unit 2 recognizes how much amount of heat is output from each heat-generating element module based on the output data received from each module control unit, and issues the control instruction in accordance with the heat output state of each heat-generating element cell 16 to be executed by the entire heat generating system 1.

The integrated control unit 2 receives the heat obtained by the entire heat generating system 1 from each heat-generating element cell 16 as output data from the output recovery unit 9 that recovers the heat from each heat-generating element cell 16, and recognizes how much amount of heat is output in the entire heat generating system 1.

The gas recovery unit 7 is provided with a circulation pump and an impurity remover (not illustrated). The circulation pump recovers the hydrogen-based gas from each heat-generating element cell 16, the impurity remover removes impurities generated in the hydrogen-based gas used in each heat-generating element cell 16 from the hydrogen-based gas, and then the circulation pump supplies the hydrogen-based gas to the gas supply unit 6.

The heat-generating element module 4a is provided with the thermal fluid circulation unit 17. The thermal fluid circulation unit 17 circulates thermal fluid used for recovering the heat output from the heat-generating element cell 16. The thermal fluid circulation unit 17 controls a flow velocity of the thermal fluid that circulates through the container outer wall of the heat-generating element cell 16, in accordance with the instruction from the corresponding module control unit 3a, and adjusts a contact time between the thermal fluid and the heat-generating element cell 16 in accordance with the heat output state of the heat-generating element cell 16, thereby efficiently absorbing the heat through the thermal fluid.

(2) Circuit Configuration of Module Control Unit

Figure 2:
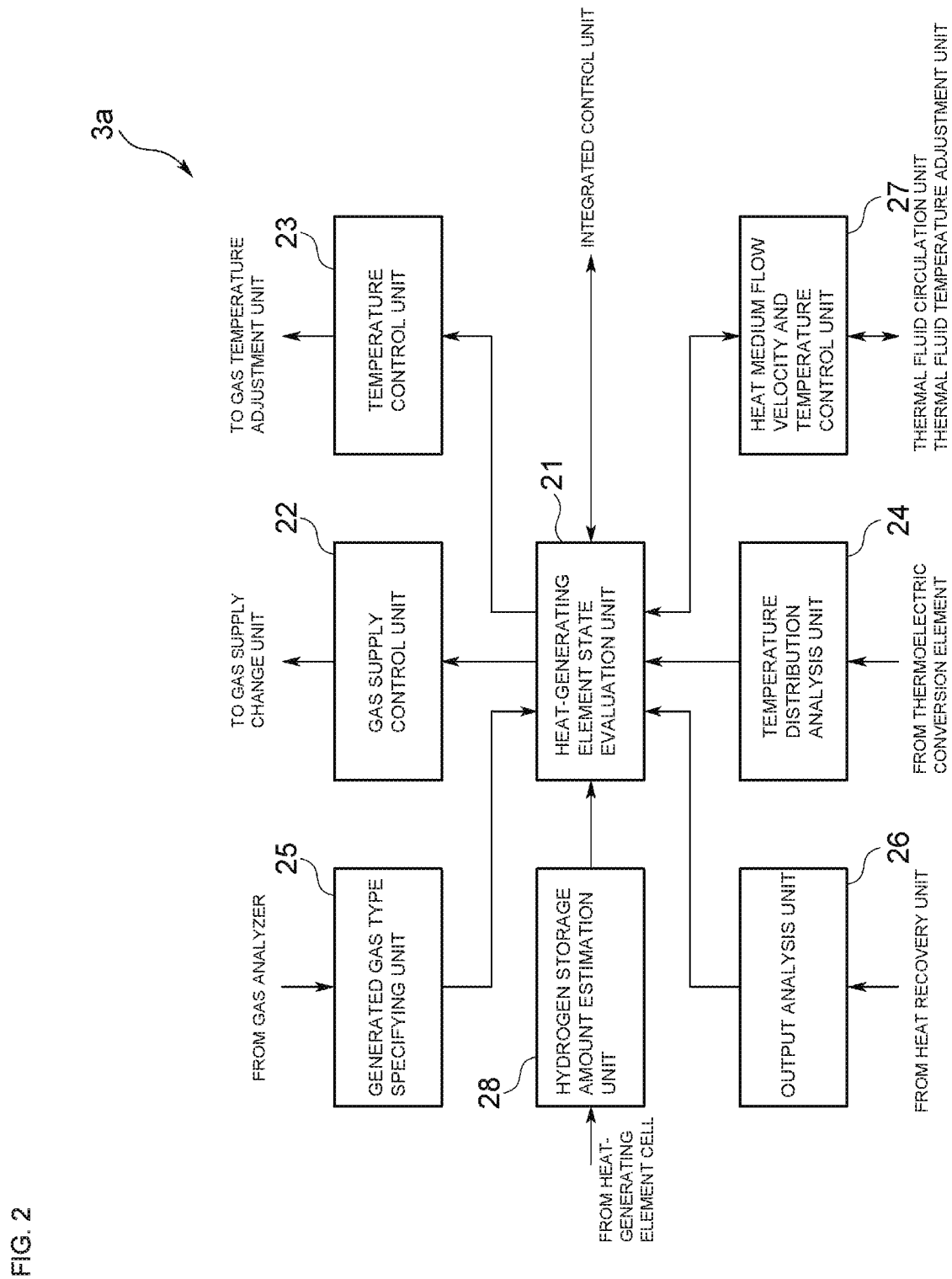
FIG. 2 is a block diagram illustrating a circuit configuration of a module control unit.

A circuit configuration of the module control unit 3a will be described. As illustrated in FIG. 2, the module control unit 3a includes a heat-generating element state evaluation unit 21 with a microcomputer configuration including CPU, RAM, ROM and the like. The module control unit 3a has a configuration in which the heat-generating element state evaluation unit 21 is connected to: a gas supply control unit 22; a gas temperature control unit 23; a temperature distribution analysis unit 24; a generated gas type specifying unit 25; a output analysis unit 26; a heat medium flow velocity and temperature control unit 27; and a hydrogen storage amount estimation unit 28.

The heat-generating element state evaluation unit 21 evaluates the heat output state of the heat-generating element cell 16 placed in the heat-generating element module 4a based on the analysis results obtained from the temperature distribution analysis unit 24, the generated gas type specifying unit 25, the output analysis unit 26, the heat medium flow velocity and temperature control unit 27, and the hydrogen storage amount estimation unit 28, and transmits the evaluation result to the integrated control unit 2.

Thus, the integrated control unit 2 determines whether each heat-generating element cell 16 generates excess heat based on the evaluation result received from each of the module control units 3a, 3b, 3c, 3d, 3e. For example, the integrated control unit 2 transmits a heat generation control instruction to the module control unit 3a having the heat-generating element cell 16 that is generating excess heat, and on the other hand, transmits an excess heat output control instruction to the module control unit 3b having the heat-generating element cell 16 that is not generating excess heat.

The heat-generating element state evaluation unit 21 receives the heat generation control instruction or the excess heat output control instruction generated by the integrated control unit 2 based on the evaluation result, and controls the heat-generating element module 4a through the gas supply control unit 22, the gas temperature control unit 23, and the heat medium flow velocity and temperature control unit 27 based on the control instruction.

The gas supply control unit 22 makes a gas supply change unit (described later) provided in the peripheral equipment 15 in the heat-generating element module 4a operate based on the instruction received from the heat-generating element state evaluation unit 21. For example, the gas supply control unit 22 changes a supply position of the hydrogen-based gas in the heat-generating element cell 16, and increase or decrease an amount of the hydrogen-based gas supplied to the heat-generating element cell 16. The gas temperature control unit 23 makes a gas temperature adjustment unit (described later) provided in the peripheral equipment 15 in the heat-generating element module 4a operate based on the instruction received from the heat-generating element state evaluation unit 21. For example, the gas temperature control unit 23 adjusts a heating temperature of the hydrogen-based gas to adjust a temperature in the heat-generating element cell 16.

The heat medium flow velocity and temperature control unit 27 makes a thermal fluid temperature adjustment unit (described later) provided in the peripheral equipment 15 in the heat-generating element module 4a operate based on the instruction received from the heat-generating element state evaluation unit 21, adjusts a temperature of the thermal fluid that circulates around the container outer wall of the heat-generating element cell 16 to recover the heat, and adjusts the temperature of the heat-generating element cell 16 through the thermal fluid. The heat medium flow velocity and temperature control unit 27 makes a thermal fluid circulation unit (described later) provided in the peripheral equipment 15 in the heat-generating element module 4a operate based on the instruction received from the heat-generating element state evaluation unit 21, and adjusts a flow velocity of the thermal fluid that circulates around the container outer wall of the heat-generating element cell 16.

When receiving a measurement result of the temperature of the heat-generating element cell 16 from a thermoelectric conversion element (described later) provided in the heat-generating element cell 16, the temperature distribution analysis unit 24 estimates a heat generation temperature at each portion of the heat-generating element cell 16. The temperature distribution analysis unit 24 calculates a change of heat quantity based on the temperature measurement result received from the thermoelectric conversion element, and estimates a heat flow velocity generated in the heat-generating element cell 16 based on the change of heat quantity. The temperature distribution analysis unit 24 transmits the estimation result of the temperature distribution in the heat-generating element cell 16 and the estimation result of the heat flow velocity in the heat-generating element cell 16 to the heat-generating element state evaluation unit 21, and reflects these estimation results to the controls of the gas supply control unit 22, the gas temperature control unit 23, and the heat medium flow velocity and temperature control unit 27.

In the present embodiment, the heat-generating element state evaluation unit 21 stores a temperature at which it can be estimated that the heat generation reaction does not occur, as a lower limit temperature, and on the other hand, stores a temperature at which it can be estimated that the heat generation reaction occurs, as an upper limit temperature. Thus, the heat-generating element state evaluation unit 21 estimates that the heat generation reaction occurs at which portion of the heat-generating element cell 16 by comparing the estimation result concerning the temperature obtained from the temperature distribution analysis unit 24 with these lower limit temperature and upper limit temperature.

The generated gas type specifying unit 25 specifies a type of gas generated in the heat-generating element cell 16 based on an analysis result received from a gas analyzer (described later) of the heat-generating element module 4a, determines whether the heat generation reaction occurs in the heat-generating element cell 16 depending on whether a specific gas is generated by the heat generation reaction, and transmits the determination result to the heat-generating element state evaluation unit 21. The output analysis unit 26 receives a heat output result from a heat recovery unit (described later) in the heat-generating element module 4a, determines whether the heat generation reaction occurs in the heat-generating element cell 16 based on the output result, and transmits the determination result to the heat-generating element state evaluation unit 21. When receiving a measurement result of an electric resistance of the hydrogen storage metal or the hydrogen storage alloy in the heat-generating element cell 16, the hydrogen storage amount estimation unit 28 determines a hydrogen storage amount of the hydrogen storage metal or the hydrogen storage alloy in the heat-generating element cell 16 based on the measurement result, and transmits the determination result to the heat-generating element state evaluation unit 21.

The hydrogen storage amount estimation unit 28 determines that the hydrogen storage amount of the hydrogen storage metal or the hydrogen storage alloy in the heat-generating element cell 16 is small when the electric resistance of the hydrogen storage metal or the hydrogen storage alloy is a preset prescribed value or higher, and determines that the hydrogen storage amount of the hydrogen storage metal or the hydrogen storage alloy in the heat-generating element cell 16 is large when the electric resistance of the hydrogen storage metal or the hydrogen storage alloy is lower than the preset prescribed value. Note that it is preferred that the hydrogen storage amount of the hydrogen storage metal or the hydrogen storage alloy in the heat-generating element cell 16 is large to reach the state where the heat generation reaction occurs.

(3) Configuration of Heat-Generating Element Module

Figure 3:
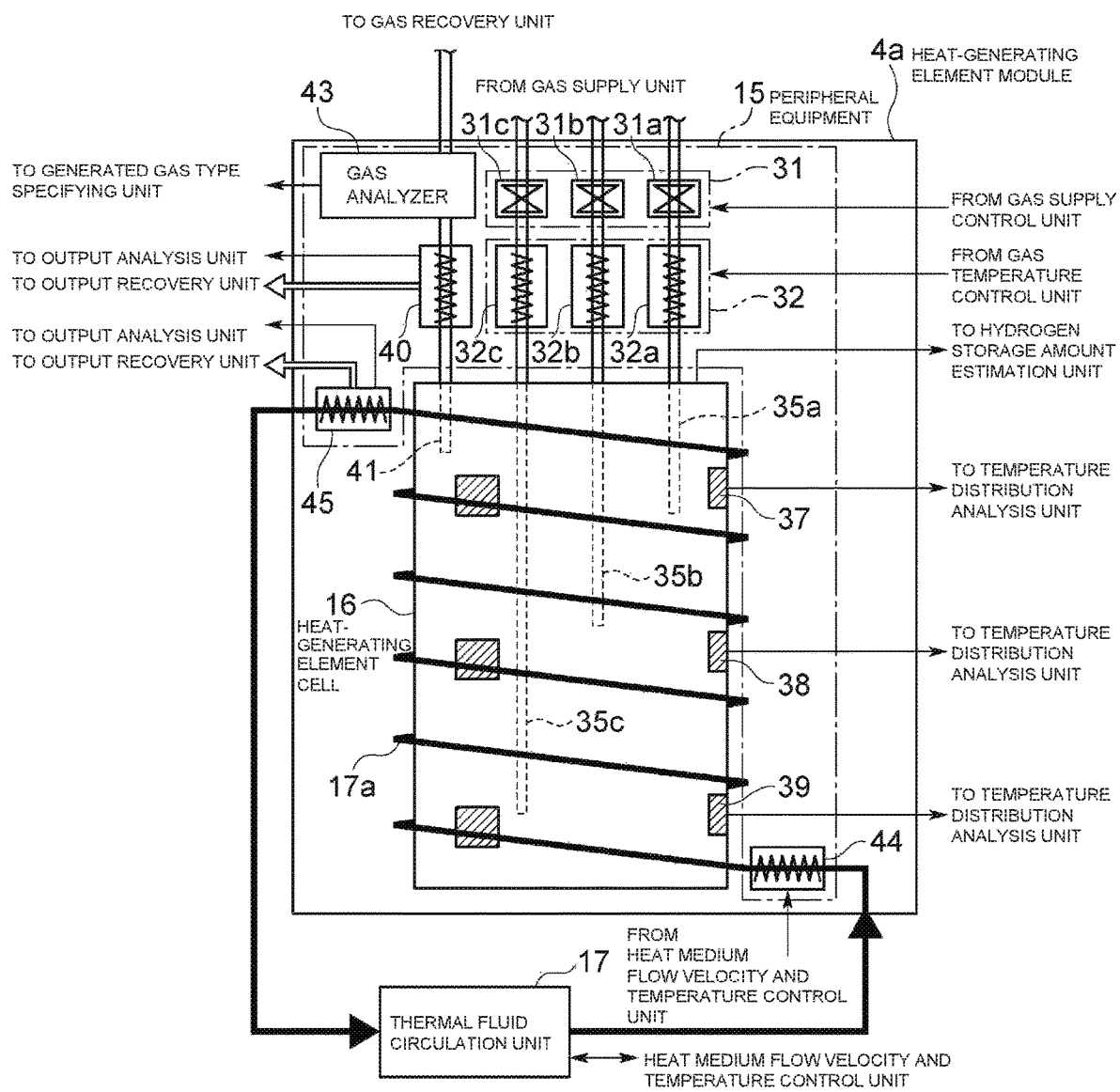
FIG. 3 is a schematic diagram illustrating a configuration of a heat-generating element module.

A configuration of a heat-generating element module controlled by the module control unit 3a will be described below. In this case, as illustrated in FIG. 3, the heat-generating element module 4a includes the heat-generating element cell 16 and the peripheral equipment 15. The peripheral equipment 15 is operated in accordance with the instruction from the module control unit 3a to cause the heat generation reaction in the heat-generating element cell 16 that is not generating excess heat or to further promote the heat generation reaction generated in the heat-generating element cell 16.

In the present embodiment, the thermoelectric conversion elements 37, 38, 39 serving as the temperature measurement units are arranged in an array form along the container outer wall of the heat-generating element cell 16, to measure the temperature of the heat-generating element cell 16 at a portion where each of the thermoelectric conversion elements 37, 38, 39 is provided. In this case, the heat-generating element cell 16 includes: a plurality of thermoelectric conversion elements 37 that are provided in an upper position of the heat-generating element cell 16 to surround the container outer wall of the heat-generating element cell 16; a plurality of thermoelectric conversion elements 38 that are provided in a middle position of the heat-generating element cell 16 to surround the container outer wall of the heat-generating element cell 16; and a plurality of thermoelectric conversion elements 39 that are provided in a lower position of the heat-generating element cell 16 to surround the container outer wall of the heat-generating element cell 16, so that temperatures are measured at different height positions on the heat-generating element cell 16 by the thermoelectric conversion elements 37, 38, 39.

The thermoelectric conversion elements 37, 38, 39 transmit the temperature measurement results of the heat-generating element cell 16 to the temperature distribution analysis unit 24 of the module control unit 3a so that the temperature distribution analysis unit 24 may detect a temperature distribution that represents a temperature at each portion of the heat-generating element cell 16.

The peripheral equipment 15 is provided with an upper supply nozzle 35a, a middle supply nozzle 35b, and a lower supply nozzle 35c that communicate with the gas supply unit 6 to extend into the heat-generating element cell 16. A gas supply change unit 31 is provided to the upper supply nozzle 35a, the middle supply nozzle 35b, and the lower supply nozzle 35c. The gas supply change unit 31 changes a supply position of the hydrogen-based gas into the heat-generating element cell 16 in accordance with the instruction from the gas supply control unit 22 of the module control unit 3a.

Actually, the gas supply change unit 31 includes; a valve 31a provided in the upper supply nozzle 35a; a valve 31b provided in the middle supply nozzle 35b that is longer than the upper supply nozzle 35a; and a valve 31c provided in the lower supply nozzle 35c that is longer than the middle supply nozzle 35b, for example, so that these valves 31a, 31b, 31c may be controlled to be opened and closed to select a supply position of the hydrogen-based gas into the heat-generating element cell 16. The gas supply change unit 31 adjusts the degree of opening of each of the valves 31a, 31b, 31c, and controls the flow velocity and supply amount of the hydrogen-based gas into the heat-generating element cell 16.

When a heat-generating element provided in the heat-generating element cell 16 is made of a hydrogen storage metal of Pd, for example, the gas supply change unit 31, as the heat generation control to cause the heat generation reaction, opens the valve 31b and closes the other valves 31a, 31c to supply the hydrogen-based gas from the middle supply nozzle 35b that has a supply port located on a center of the inside of the heat-generating element cell 16. Then, when the module control unit 3a determines that an upper position of the heat-generating element cell 16 becomes high temperature and the excess heat generating position where the heat generation reaction is occurring is the upper position, for example, the gas supply change unit 31 also opens the valve 31a in addition to the valve 31b and keeps the other valve 31c closed in accordance with the instruction from the gas supply control unit 22, to also supply the hydrogen-based gas from the upper supply nozzle 35a that has a supply port of the hydrogen-based gas located at the nearest position to the upper position where the heat generation reaction is estimated to be occurring.

Thus, in the heat-generating element cell 16, more hydrogen-based gas is supplied to the upper position where the heat generation reaction is estimated to be occurring, to keep the temperature in the heat-generating element cell 16 at an optimum temperature. Thus, the hydrogen storage amount of the hydrogen storage metal or the hydrogen storage alloy on the upper position becomes large to thereby promote the heat generation reaction.

On the other hand, when the module control unit 3a determines that a lower position of the heat-generating element cell 16 becomes high temperature and the excess heat generating position where the heat generation reaction is occurring is the lower position, for example, the gas supply change unit 31 also opens the valve 31c in addition to the valve 31b and keeps the other valve 31a closed in accordance with the instruction from the gas supply control unit 22, to also supply the hydrogen-based gas from the lower supply nozzle 35c that has a supply port of the hydrogen-based gas located at the nearest position to the lower position where the heat generation reaction is estimated to be occurring. Thus, in the heat-generating element cell 16, more hydrogen-based gas is supplied to the lower position where the heat generation reaction is estimated to be occurring, and the hydrogen storage amount of the hydrogen storage metal or the hydrogen storage alloy on the lower position becomes large, to thereby promote the heat generation reaction.

The present embodiment describes a case in which the hydrogen-based gas is supplied from the upper supply nozzle 35a or the lower supply nozzle 35c that has a supply port located near the excess heat generating position where the heat generation reaction is estimated to be occurring in the heat-generating element cell 16, but the present invention is not limited thereto. The hydrogen-based gas may be supplied from all of the upper supply nozzle 35a, the middle supply nozzle 35b, and the lower supply nozzle 35c to the heat-generating element cell 16 in which the heat generation reaction is estimated to be occurring.

The peripheral equipment 15 includes, in addition to such gas supply change unit 31, a gas temperature adjustment unit 32 that is provided to the upper supply nozzle 35a, the middle supply nozzle 35b, and the lower supply nozzle 35c. The gas temperature adjustment unit 32 heats the hydrogen-based gas supplied into the heat-generating element cell 16 in accordance with the instruction from the gas supply control unit 22 of the module control unit 3a, to adjust the temperature in the heat-generating element cell 16.

Actually, the gas temperature adjustment unit 32 includes; a heating unit 32a provided in the upper supply nozzle 35a; a heating unit 32b provided in the middle supply nozzle 35b; and a heating unit 32c provided in the lower supply nozzle 35c, for example, so that the gas temperature adjustment unit 32 controls the heating of these heating units 32a, 32b, 32c to heat the hydrogen-based gas supplied into the heat-generating element cell 16 at a predetermined temperature.

In this case, the gas temperature adjustment unit 32 operates only the heating units 32a, 32b, 32c provided to the upper supply nozzle 35a, the middle supply nozzle 35b and the lower supply nozzle 35c that are used to supply the hydrogen-based gas into the heat-generating element cell 16 among the upper supply nozzle 35a, the middle supply nozzle 35b and the lower supply nozzle 35c to heat the hydrogen-based gas supplied into the heat-generating element cell 16.

The peripheral equipment 15 is provided with a gas recovery nozzle 41 that communicates with the gas recovery unit 7 to extend from the heat-generating element cell 16, and a heat recovery unit 40 and a gas analyzer 43 are provided to the gas recovery nozzle 41. The gas recovery nozzle 41 discharges the hydrogen-based gas in the heat-generating element cell 16 from the inside of the heat-generating element cell 16 to feed it to the gas recovery unit 7. Thus, in the heat-generating element cell 16, a pressure inside the container is adjusted by sucking the hydrogen-based gas.

When the hydrogen-based gas heated in the heat-generating element cell 16 that is generating excess heat is discharged from the inside of the heat-generating element cell 16 to the gas recovery unit 7, the heat recovery unit 40 takes heat from the hydrogen-based gas to thereby propagate the heat obtained from the hydrogen-based gas to the output recovery unit 9. Note that the heat recovery unit 40 transmits an output recovery result that represents what degree of heat is recovered from the hydrogen-based gas, to the output analysis unit 26 of the module control unit 3a. When the hydrogen-based gas is discharged from the inside of the heat-generating element cell 16 to the gas recovery unit 7, the gas analyzer 43 temporarily stores part of the hydrogen-based gas therein, analyzes substances contained in the hydrogen-based gas, and transmits the analysis result to the generated gas type specifying unit 25. Thus, the generated gas type specifying unit 25 specifies the substances contained in the hydrogen-based gas by comparing the analysis result received from the gas analyzer 43 with the pre-stored gas feature data.

Note that in the heat-generating element cell 16, a cylindrical circulating passage 17a is provided to be wound around the container outer wall, and a thermal fluid such as water flows through the circulating passage 17a. The thermal fluid circulates from the thermal fluid circulation unit 17, and takes heat from the heat-generating element cell 16 by contacting with the heat-generating element cell 16, thereby capable of recovering the heat.

The peripheral equipment 15 is provided with a heating unit 44 that heats such thermal fluid and a heat recovery unit 45 that takes the heat from the thermal fluid and outputs the heat to the output recovery unit 9. The heating unit 44 is provided at a position before the thermal fluid contacts with the heat-generating element cell 16, and heats the thermal fluid before the thermal fluid contacts with the heat-generating element cell 16 in accordance with an instruction from the heat medium flow velocity and temperature control unit 27 to thereby heat the heat-generating element cell 16.

The heat recovery unit 45 is provided at a position after the thermal fluid contacts with the heat-generating element cell 16, takes heat from the thermal fluid heated in the heat-generating element cell 16 that is generating excess heat to thereby propagate the heat thus obtained to the output recovery unit 9. Note that the heat recovery unit 45 transmits an output recovery result that represents what degree of heat is recovered from the thermal fluid, to the output analysis unit 26 of the module control unit 3a.

In the present embodiment, higher hydrogen concentration in the hydrogen storage metal or the hydrogen storage alloy provided in the heat-generating element cell 16 tends to easily cause the heat generation reaction in the heat-generating element cell 16, and the probability of generating excess heat can be considered to be high. The peripheral equipment 15 controls supply of the hydrogen-based gas into the heat-generating element cell 16, a temperature in the heat-generating element cell 16, and a pressure in the heat-generating element cell 16, thereby capable of increasing the hydrogen concentration in the hydrogen storage metal or the hydrogen storage alloy provided in the heat-generating element cell 16, further promoting the heat generation reaction in the heat-generating element cell 16, and increasing or maintaining the excess heat output from the heat-generating element cells.

Figure 4:
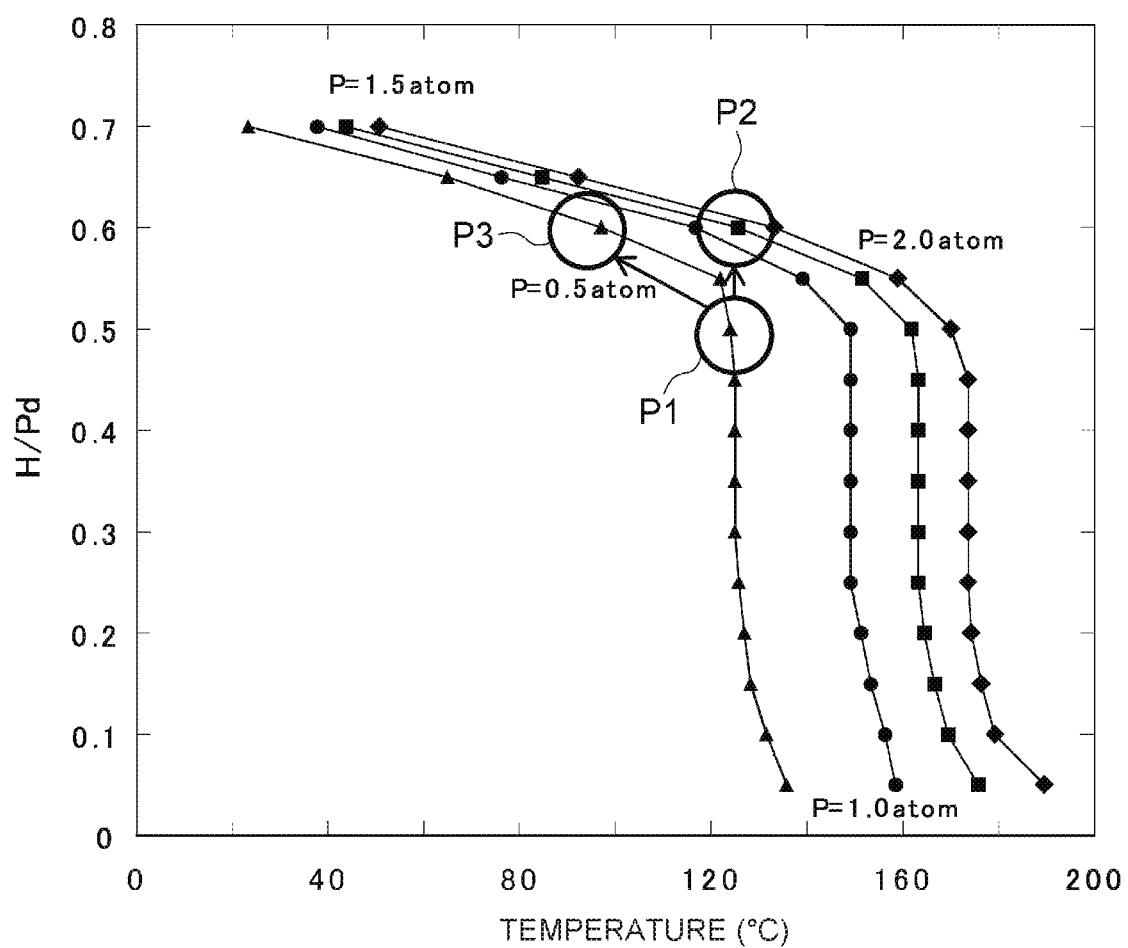
FIG. 4 is a graph showing a relationship among a hydrogen storage amount and a temperature of Pd, and a pressure.

FIG. 4 is a graph showing a hydrogen concentration of palladium (Pd) that can be used as the hydrogen storage metal provided in the heat-generating element cell 16. FIG. 4 shows a relationship between a temperature and a hydrogen concentration of Pd when pressures in the inside of the container is 0.5 [atom], 1.0 [atom], 1.5 [atom], and 2.0 [atom], respectively. For example, when from a case where the temperature is about 130° C. at a pressure of 0.5 [atom] and the hydrogen concentration of Pd is about 0.5 [H/Pd] (indicated by P1 in FIG. 4), the pressure is increased to 1.5 [atom] without changing the temperature, the hydrogen concentration of Pd is increased to about 0.65 [H/Pd] (indicated by P2 in FIG. 4). On the other hand, even when the temperature is lowered to about 90° C. at the pressure of 0.5 [atom], the hydrogen concentration of PD is increased to about 0.65 [H/Pd] (indicated by P3 in FIG. 4).

In the heat-generating element module 4$a$, when the excess heat is generated in the heat-generating element cell 16, the heating units 32$a$, 32$b$, 32$c$ lower the heating temperature of the hydrogen-based gas, and the heating unit 44 lowers the heating temperature of the thermal fluid to lower the temperature of the heat-generating element cell 16, in accordance with the instruction from the module control unit 3$a$ to promote the heat generation reaction that occurred in the heat-generating element cell 16. The heat-generating element module 4$a$ adjusts a gas suction amount from the gas recovery nozzle 41 in accordance with the instruction from the module control unit 3$a$ to increase a pressure in the heat-generating element cell 16. Thus, the heat-generating element module 4$a$ increases the hydrogen storage amount of the hydrogen storage metal or the hydrogen storage alloy in the heat-generating element cell 16 to further easily cause the heat generation reaction in the heat-generating element cell 16 that is generating excess heat, thereby increasing and maintaining the excess heat output from the heat-generating element cell 16.

Note that when Ni is used as the hydrogen storage metal, a hydrogen concentration of Ni is increased as the temperature is increased without changing the pressure. Contrary to Pd, the heating units 32$a$, 32$b$, 32$c$ increase the heating temperature of the hydrogen-based gas, and the heating unit 44 increases the heating temperature of the thermal fluid to increase the temperature of the heat-generating element cell 16, so that the hydrogen storage amount of the hydrogen storage metal in the heat-generating element cell 16 is increase to promote the heat generation reaction in the heat-generating element cell 16.

(4) Operation and Effect

In the above configuration, the heat generating system 1 according to the present invention includes the plurality of heat-generating element cells 16 each of which generates excess heat using the hydrogen storage metal or the hydrogen storage alloy when hydrogen-based gas contributing to heat generation is supplied into a container, and further includes the integrated control unit 2 that controls the heat generation by each of the heat-generating element cells 16 by heating each of the heat-generating element cells 16 and supplying the hydrogen-based gas into each of the heat-generating element cells 16.

Figure 5:
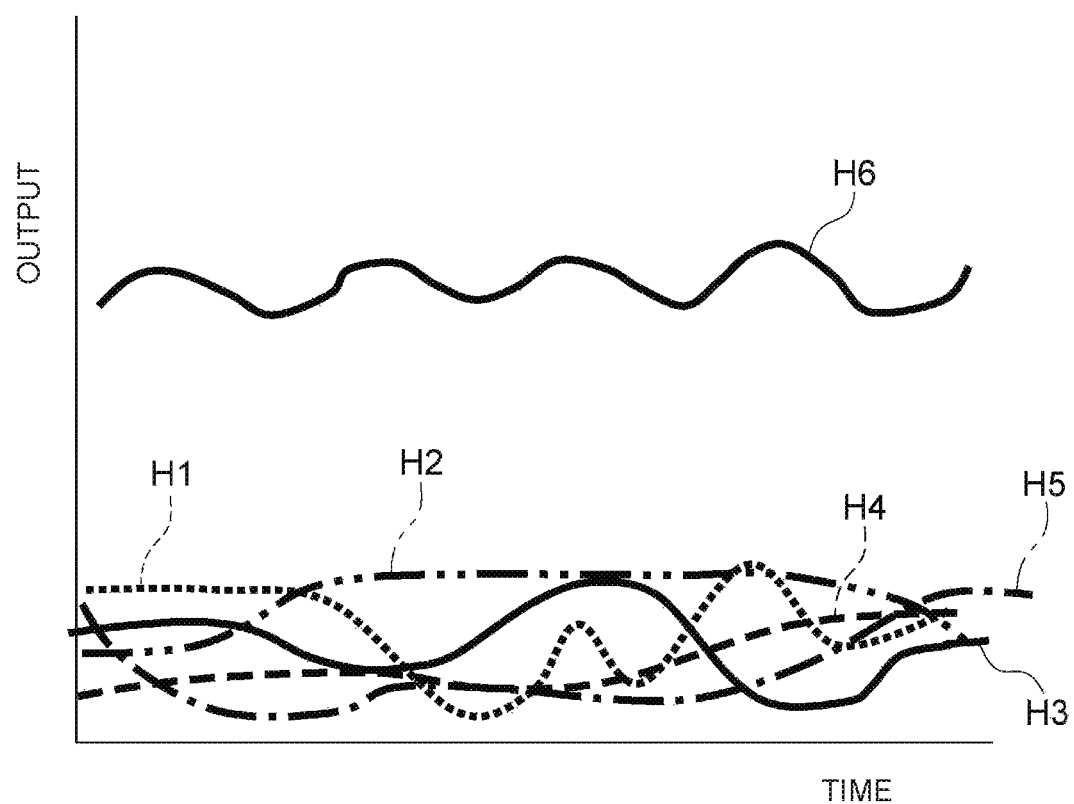
FIG. 5 is a graph showing output results of heat generated from the heat generating system provided with five heat-generating element cells.

FIG. 5 is a graph showing a relationship between time and a heat output in the heat generating system 1 provided with five heat-generating element cells 16 as an example. In FIG. 5, results of heat outputs from first to fifth heat-generating element cells 16 are indicated by curves H1 to H5, and the total of heat outputs from these five heat-generating element cell 16 is indicated by a curve H6 as a result of a heat output in the entire heat generating system 1.

In this case, the heat generating system 1 is provided with the heat-generating element cells 16 each of which generates excess heat by the heat generation reaction that are disclosed in Non Patent Literature 1, Non Patent Literature 2, Non Patent Literature 6, and International Publication No. WO 2015/008859. Thus, the heat output from each of the heat-generating element cells 16 is unstable as shown by the curves H1 to H5, and therefore expected heat output results may not be obtained.

In the heat-generating element cells 16 using the heat generation reaction that are disclosed in Non Patent Literature 1, Non Patent Literature 2, Non Patent Literature 6, and International Publication No. WO 2015/008859, when the heat generation reaction is insufficient in any of the heat-generating element cells 16, the probability of generating excess heat may be low even in the case of trying to perform the temperature adjustment of the heat-generating element cell 16, the supply control of the hydrogen-based gas into the heat-generating element cell 16, and the pressure control in the heat-generating element cell 16.

Thus, in the heat generating system 1, focusing on the heat-generating element cell 16 in which the heat generation reaction is occurring, the integrated control unit 2, while controlling the proper heat generation which may cause the heat generation reaction in the heat-generating element cell 16 of the heat-generating element module 4$b$ that is not generating excess heat, for example, further controls an excess heat output of the heat-generating element cell 16 of the heat-generating element module 4$a$ that is generating excess heat by performing temperature adjustment of the heat-generating element cell 16, supply control of the hydrogen-based gas into the heat-generating element cell 16, or pressure control in the heat-generating element cell 16 in addition to the heat generation control, to increase the number of heat generation reaction positions in the heat-generating element cell 16 that is generating excess heat to thereby further increase and maintain the excess heat output.

Thus, the heat generating system 1 of the present invention controls the excess heat output of the heat-generating element cells 16 that are generating excess heat by the heat generation reaction among the plurality of heat-generating element cells 16, by increasing the number of heat generation reaction positions, and therefore even if the other heat-generating element cells 16 do not generate excess heat due to insufficient heat generation reaction, the heat-generating element cells 16 in which the heat generation reaction is certainly occurring can compensate for insufficient amount of heat to be recovered, thereby capable of stably obtaining heat using the heat-generating element cells 16 each of which generates heat using the hydrogen storage metal or the hydrogen storage alloy.

In the heat generating system 1 in the present embodiment, each of the heat-generating element cells 16 is provided with a plurality of thermoelectric conversion elements 37, 38, 39 that measure the temperatures of respective positions on the container outer wall of the heat-generating element cell 16. In the heat generating system 1, the temperature distribution of each of the heat-generating element cells 16 is specified based on the measurement results obtained from the thermoelectric conversion elements 37, 38, 39, and the integrated control unit 2 determines whether each of the heat-generating element cells 16 generates excess heat based on the temperature distribution.

The integrated control unit 2 can specify the heat-generating element cells 16 in which the heat generation reaction is occurring, among the plurality of heat-generating element cells 16, and certainly control the excess heat output of the specified heat-generating element cells 16 that are generating excess heat by performing temperature adjustment of the heat-generating element cell 16, supply control of the hydrogen-based gas into the heat-generating element cell 16, or pressure control in the heat-generating element cell 16.

In the heat generating system 1, each of the heat-generating element cells 16 is provided with the gas supply change unit 31 that changes a height position when the hydrogen-based gas is supplied into the heat-generating element cell 16, to set a supply position of the hydrogen-based gas into the heat-generating element cell 16 that is generating excess heat at a position where the probability of generating the heat generation reaction is high around the excess heat generating position, or to set it at a position around which the temperature is increased which is a sign of the excess heat generation, to increase the number of heat generation reaction positions in the heat-generating element cell 16 that is generating excess heat to thereby further be capable of increasing and maintaining the excess heat output in the heat-generating element cell 16 that is generating excess heat.

The integrated control unit 2 increases the flow velocity of the thermal fluid that flows in contact with the container outer wall of the heat-generating element cell 16 that is generating excess heat so as to be faster than that of the thermal fluid that flows in contact with the container outer wall of the other heat-generating element cell 16 that is not generating excess heat to increase a recovery rate of heat from the thermal fluid in the heat-generating element cell 16 that is generating excess heat. Thus, in the heat generating system 1, even if the other heat-generating element cells 16 do not generate excess heat due to insufficient heat generation reaction, the heat-generating element cells 16 in which the heat generation reaction is certainly occurring can compensate for insufficient amount of heat to be recovered, thereby capable of stably obtaining heat using the heat-generating element cells 16 each of which generates heat using the hydrogen storage metal or the hydrogen storage alloy.

(5) Heat Generating System of Other Embodiment

In the heat generating system 1 in the above-described embodiment, when there are the heat-generating element cells 16 that are not generating excess heat and the other heat-generating element cells 16 that are generating excess heat, maintaining the excess heat output by increasing the number of heat generation reaction positions of the heat-generating element cells 16 in which the heat generation reaction is occurring can obtain the stable heat in the entire heat generating system 1 more certainly and easily than generating the heat generation reaction in the heat-generating element cells 16 that are not generating excess heat.

Thus, in the above-described heat generating system 1, in addition to the heat generation control for the heat-generating element cell 16 that is not generating excess heat, the excess heat output of the other heat-generating element cell 16 that is generating excess heat is controlled by performing at least any of temperature adjustment of the heat-generating element cell 16, supply control of the hydrogen-based gas into the heat-generating element cell 16, and pressure control in the heat-generating element cell 16, thereby increasing and/or maintaining the excess heat output from the heat-generating element cell 16.

However, the present invention is not limited thereto. In the heat generating system 1, when there are the heat-generating element cells 16 that are not generating excess heat and the other heat-generating element cells 16 that are generating excess heat, the excess heat outputs may be controlled for the heat-generating element cells 16 that are not generating excess heat if the probability of generating the heat generation reaction is high in the heat-generating element cells 16 that are not generating excess heat.

In this case, the heat generating system, while controlling the proper heat generation to cause the heat generation reaction in the heat-generating element cell 16 that is generating excess heat, controls an excess heat output of the other heat-generating element cell 16 that is not generating excess heat by performing at least any of temperature adjustment of the heat-generating element cell 16, supply control of the hydrogen-based gas into the heat-generating element cell 16, and pressure control in the heat-generating element cell 16 in addition to the heat generation control, thereby promoting the excess heat output from the heat-generating element cell 16.

Even if some heat-generating element cells do not generate excess heat due to insufficient heat generation reaction among the plurality of heat-generating element cells, such a heat generating system, as the excess heat output control, tries to generate the heat generation reaction to the heat-generating element cells that are not generating excess heat to promote the excess heat output, and further can control so that the heat-generating element cells that are generating excess heat compensate for insufficient amount of heat to be recovered, thereby capable of stably obtaining heat using the heat-generating element cells each of which generates heat using a hydrogen storage metal or a hydrogen storage alloy.

(6) Temperature Measurement Unit of Other Embodiment

Figure 6:
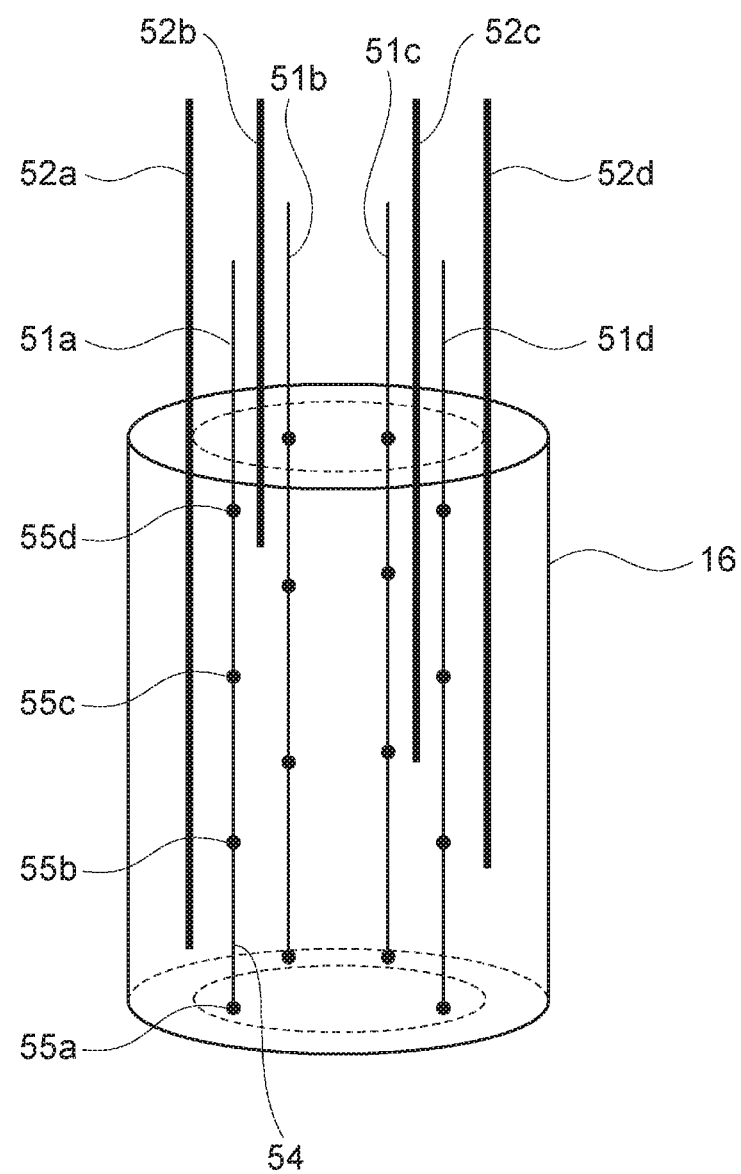
FIG. 6 is a schematic diagram illustrating a configuration in which temperature measurement units are provided inside the heat-generating element cell.

The above-described embodiment describes a case in which the thermoelectric conversion elements 37, 38, 39 serving as the temperature measurement units are arranged in an array form along the container outer wall of the heat-generating element cell 16, but the present invention is not limited thereto. The temperature measurement units may be also arranged in an array form inside the container of the heat-generating element cell 16. FIG. 6 is a diagram illustrating a configuration in which temperature measurement units 51a, 51b, 51c, 51d are provided inside the container of the heat-generating element cell 16. All of the temperature measurement units 51a, 51b, 51c, 51d have the same configuration. For example, the temperature measurement unit 51a includes thermocouple elements 55a, 55b, 55c, 55d that are arranged on a support 54 extending from an upper portion to a lower portion of the heat-generating element cell 16, and can measure the temperatures using the thermocouple elements 55a, 55b, 55c, 55d over a range from the upper portion to the lower portion of the heat-generating element cell 16. Note that an internal structure of the heat-generating element cell 16 in which the heat generation reaction occurs is the same as that of the above-described embodiment, and therefore the illustration and the like are omitted.

The temperature measurement units 51a, 51b, 51c, 51d thus configured are arranged at equal intervals, measures the temperature of whole interior of the heat-generating element cell 16, and transmits the measurement result to the temperature distribution analysis unit 24 of the module control unit 3a (see FIG. 2). Thus, the temperature distribution analysis unit 24 specifies the temperature distribution in each of the heat-generating element cells 16 based on the measurement result obtained from the temperature measurement units 51a, 51b, 51c, 51d, and the integrated control unit 2 determines whether each of the heat-generating element cells 16 generates excess heat based on the temperature distribution.

Note that the heat-generating element cell 16 is provided with supply nozzles 52a, 52b, 52c, 52d that have different lengths, and supply ports of the supply nozzles 52a, 52b, 52c, 52d are determined in accordance with the positions of the temperature measurement units 51a, 51b, 51c, 51d and the arrangement heights of the thermocouple elements 55a, 55b, 55c, 55d so that the hydrogen-based gas is supplied to predetermined positions of the heat-generating element cell 16 in accordance with the temperature distribution obtained from the temperature measurement units 51a, 51b, 51c, 51d.

(7) Heat Generating System Using Heat-Generating Element Cell in which Electrolytic Solution Is Used as Fluid Contributing to Heat Generation The above-described embodiment describes the heat-generating element cell in which the hydrogen-based gas is applied as a hydrogen-based fluid contributing to the heat generation, but the present invention is not limited thereto. A heat-generating element cell using the electrolytic solution as the hydrogen-based fluid contributing to the heat generation may be applied.

Figure 7:
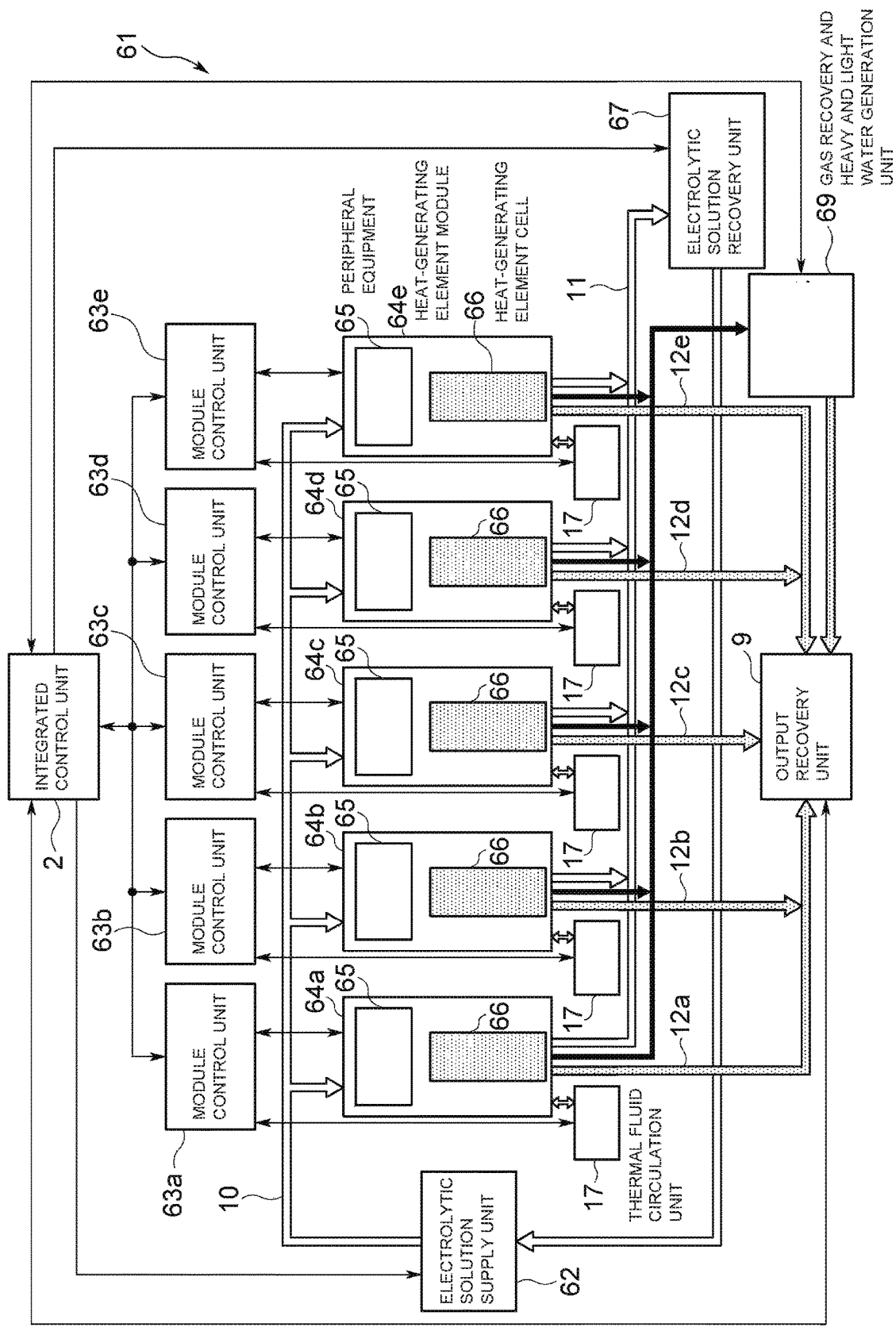
FIG. 7 is a schematic diagram illustrating an entire configuration of a heat generating system when an electrolytic solution is used as a hydrogen-based fluid contributing to the heat generation.

FIG. 7 is a diagram illustrating a heat generating system 61 using the electrolytic solution as the hydrogen-based fluid contributing to the heat generation in which components corresponding to components in FIG. 1 are designated with the same reference numerals as those used in FIG. 1. A heat-generating element cell 66 used in the heat generating system 61 is a heat-generating element cell 66 that generates excess heat by the heat generation reaction disclosed in Non Patent Literature 3 and Non Patent Literature 4, and is provided with a hydrogen storage metal such as Pd, Ni, Pt, and Ti, or a hydrogen storage alloy containing at least one of these elements inside the container. The electrolytic solution is supplied into the container and heated which causes the heat generation reaction, thereby obtaining the excess heat.

Note that the present embodiment describes a case in which a heat-generating element cell disclosed in Non Patent Literatures 3, 4 is used as the heat-generating element cell that generates excess heat using the hydrogen storage metal or the hydrogen storage alloy when the electrolytic solution contributing to the heat generation is supplied into the container, but the present invention is not limited thereto. If excess heat can be generated using the hydrogen storage metal or the hydrogen storage alloy when the electrolytic solution contributing to the heat generation is supplied into the container, any configuration disclosed in the other various Non Patent Literatures and Patent Literatures may be used as the heat-generating element cell. The electrolytic solution used here is a deuterium-based electrolytic solution that contains deuterium at a predetermined concentration such as lithium deuteroxide (LiOD), KOD, or NaOD, for example.

In this case, as illustrated in FIG. 7, a heat generating system 61 has a configuration in which the integrated control unit 2 is connected to: module control units 63a, 63b, 63c, 63d, 63e that control heat-generating element modules 64a, 64b, 64c, 64d, 64e, respectively; an electrolytic solution supply unit 62 that supplies an electrolytic solution contributing to heat generation of a heat-generating element cells 66 into each of the heat-generating element modules 64a, 64b, 64c, 64d, 64e through a pipe 10; an electrolytic solution recovery unit 67 that recovers the electrolytic solution from each of the heat-generating element modules 64a, 64b, 64c, 64d, 64e through a pipe 11 and feeds it to the electrolytic solution supply unit 62 again; a thermal fluid circulation unit 17 that is provided to each of the heat-generating element modules 64a, 64b, 64c, 64d, 64e; an output recovery unit 9 that recovers the heat output from each of the heat-generating element modules 64a, 64b, 64c, 64d, 64e through pipes 12a, 12b, 12c, 12d, 12e, respectively; and a gas recovery and heavy and light water generation unit 69.

The electrolytic solution supply unit 62 adjusts a deuterium concentration of the electrolytic solution in a storage tank (not illustrated) or the electrolytic solution received from the electrolytic solution recovery unit 67 in accordance with an instruction from the integrated control unit 2 to feed the electrolytic solution after the deuterium concentration is adjusted to each of the heat-generating element modules 64a, 64b, 64c, 64d, 64e. In the heat-generating element module 64a, peripheral equipment 65 performs amount control of the electrolytic solution supplied to the heat-generating element cell 66, pressure control in the heat-generating element cell 66, heating temperature control of the heat-generating element cell 66, and the like in accordance with an instruction from the module control unit 63a, in order to control the heat generation so that excess heat is generated in the heat-generating element cell 66.

Note that in the heat-generating element cell 66 in each of the heat-generating element modules 64a, 64b, 64c, 64d, 64e, the electrolytic solution is electrolyzed by electrodes in the container, thereby generating deuterium gas and oxygen gas (collectively simply referred to as generated gas). The gas recovery and heavy and light water generation unit 69 provided as a gas treating unit, in accordance with the instruction from the integrated control unit 2, recovers the generated gas generated in the heat-generating element cell 66 to obtain electric power from the generated gas by a fuel cell (not illustrated), for example, and generates heavy water or light water from the generated gas to feed it to the electrolytic solution recovery unit 67 or the electrolytic solution supply unit 62 to reuse. Note that the gas recovery and heavy and light water generation unit 69 may be provided with catalyst, in this case, the catalyst is used to recover the heat from the generated gas and obtain heavy water or light water from the generated gas, to feed them to the electrolytic solution recovery unit 67 or the electrolytic solution supply unit 62 to reuse. At this time, electric power and heat generated from the gas recovery and heavy and light water generation unit 69 can be recovered by the output recovery unit 9.

The peripheral equipment 65 provided to each of the heat-generating element modules 64a, 64b, 64c, 64d, 64e is provided with a concentration adjustment unit that individually adjusts deuterium concentration of the electrolytic solution, to adjust the deuterium concentration of the electrolytic solution by each heat-generating element cell 66.

Figure 8:
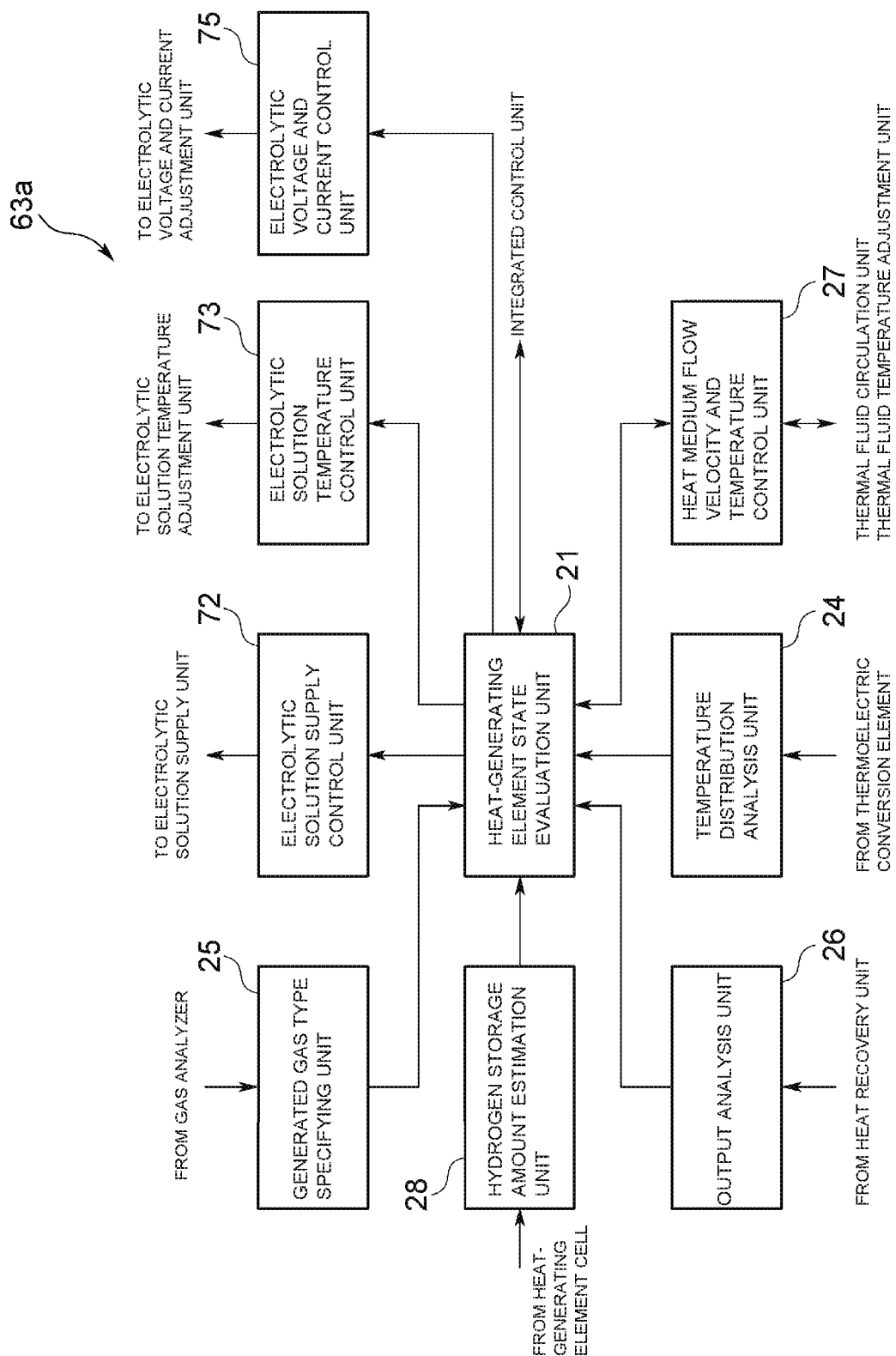
FIG. 8 is a block diagram illustrating a circuit configuration of a module control unit when the electrolytic solution is used as the hydrogen-based fluid contributing to the heat generation.

As illustrated in FIG. 8 in which components corresponding to components in FIG. 2 are designated with the same reference numerals as those used in FIG. 2, the module control unit 63a includes; an electrolytic solution supply control unit 72 that transmits a control instruction to an electrolytic solution supply unit (not illustrated) provided in the peripheral equipment 65: an electrolytic solution temperature control unit 73 that transmits the control instruction to an electrolytic solution temperature adjustment unit (not illustrated) provided in the peripheral equipment 65; and an electrolytic voltage and current control unit 75 that transmits the control instruction to an electrolytic voltage and current adjustment unit (not illustrated) provided in the peripheral equipment 65, in which a heat-generating element state evaluation unit 21 is connected to the electrolytic solution supply control unit 72, the electrolytic solution temperature control unit 73, and the electrolytic voltage and current control unit 75.

The heat-generating element state evaluation unit 21 evaluates the heat output state of the heat-generating element cell 66 placed in the heat-generating element module 64a based on the analysis results obtained from the temperature distribution analysis unit 24, the generated gas type specifying unit 25, the output analysis unit 26, the heat medium flow velocity and temperature control unit 27, and the hydrogen storage amount estimation unit 28, and transmits the evaluation result to the integrated control unit 2. The heat-generating element state evaluation unit 21 receives the control instruction generated by the integrated control unit 2 based on the evaluation result, and controls the heat-generating element module 64a through the electrolytic solution supply control unit 72, the electrolytic solution temperature control unit 73, the heat medium flow velocity and temperature control unit 27, and the electrolytic voltage and current control unit 75 based on the control instruction.

Thus, in the heat generating system 61, focusing on the heat-generating element cell 66 in which the heat generation reaction is occurring, the integrated control unit 2, while controlling the proper heat generation which may cause the heat generation reaction in the heat-generating element cell 66 of the heat-generating element module 64b that is not generating excess heat, for example, controls an excess heat output of the heat-generating element cell 66 of the heat-generating element module 64a that is generating excess heat by performing temperature adjustment of the heat-generating element cell 66, supply control of the electrolytic solution into the heat-generating element cell 66, or electrolytic solution voltage and current control in the heat-generating element cell 66 in addition to the heat generation control, to increase the number of heat generation reaction positions in the heat-generating element cell 66 that is generating excess heat to thereby further increase and maintain the excess heat output.

Note that the supply control of the electrolytic solution into the heat-generating element cell 66 by the integrated control unit 2 includes the individual concentration adjustment of the electrolytic solution by the peripheral equipment 65 of each of the heat-generating element modules 64a, 64b, 64c, 64d, 64e in addition to the adjustment of an amount of the electrolytic solution supplied into the heat-generating element cell 66 by the peripheral equipment 65. The concentration of the electrolytic solution supplied into the heat-generating element cell 66 is adjusted, and thereby the deuterium concentration in the electrolytic solution becomes high or an amount of the electrolytic solution to be supplied is increase, thereby capable of promoting the heat generation reaction in the heat-generating element cell 66.

Similarly to the above-described embodiment, the temperature adjustment of the heat-generating element cell 66 differs depending on the type of hydrogen storage metal or hydrogen storage alloy provided in the heat-generating element cell 66, but the heating temperature in the excess heat output control is lowered than that in the heat generation control when Pd is used, for example, to increase the hydrogen storage amount of Pd, thereby promoting the heat generation reaction in the heat-generating element cell 66.

In the electrolytic voltage and current control in the heat-generating element cell 66 by the integrated control unit 2, the voltage or the current applied to the electrodes (an anode and a cathode) provided in the heat-generating element cell 66 is higher than that in the heat generation control by the electrolytic voltage and current adjustment unit provided in the peripheral equipment 65 of each of the heat-generating element modules 64a, 64b, 64c, 64d, 64e, to increase an amount of the electrolytic solution to be electrolyzed, thereby capable of promoting the heat generation reaction in the heat-generating element cell 66.

Thus, the heat generating system 61 of the present invention controls the excess heat output of the heat-generating element cells 66 that are generating excess heat by the heat generation reaction among the plurality of heat-generating element cells 66, by increasing the number of heat generation reaction positions, and therefore even if the other heat-generating element cells 66 do not generate excess heat due to insufficient heat generation reaction, the heat-generating element cells 66 in which the heat generation reaction is certainly occurring can compensate for insufficient amount of heat to be recovered, thereby capable of stably obtaining heat using the heat-generating element cells 66 each of which generates heat using the hydrogen storage metal or the hydrogen storage alloy.

Note the in the present embodiment, the output recovery unit 9, similarly to the above-described embodiment, recovers heat generated from the container outer wall of each of the heat-generating element cells 66, and recovers heat from the electrolytic solution discharged from each heat-generating element cell 66 and the generated gas discharged from each heat-generating element cell 66 (the generated gas generated by the heat generation reaction), thereby efficiently recovering the heat obtained from each heat-generating element cell 66. When thus recovering the heat generated from the container outer wall of each heat-generating element cell 66, the output recovery unit 9 may recover the heat from any one of the electrolytic solution discharged from each heat-generating element cell 66 and the generated gas discharged from each heat-generating element cell 66.

In the heat generating system 61 of the other embodiment, similarly to "(5) Heat Generating System of Other Embodiment", when there are the heat-generating element cells 66 that are not generating excess heat and the other heat-generating element cells 66 that are generating excess heat, the excess heat outputs may be controlled for the heat-generating element cells 66 that are not generating excess heat if the probability of generating the heat generation reaction is high in the heat-generating element cells 66 that are not generating excess heat.

In the heat-generating element cell 66 using the electrolytic solution, similarly to the above-described "(6) Temperature Measurement Unit of Other Embodiment", the temperature measurement units 51a, 51b, 51c, 51d may be provided inside the container.

(8) Others

Note that the above-described embodiment describes a case in which a gas supply change unit 31 that changes a height position when the hydrogen-based gas is supplied into the heat-generating element cell 16 is applied as a gas supply change unit that changes a supply position when the hydrogen-based gas is supplied into the heat-generating element cell, but the present invention is not limited thereto, and may apply the gas supply change unit that changes the positions to various other positions such as a width-directional position when the hydrogen-based gas is supplied into the heat-generating element cell. In this case, the heat-generating element cell 16 may be provided with a plurality of supply nozzles having supply ports that are arranged at different positions in the heat-generating element cell 16.

The above-described embodiment also describes a case in which one gas recovery nozzle 41 having a suction port at a predetermined position in the heat-generating element cell 16 is provided as a gas recovery nozzle, but the present invention is not limited thereto, and may provide a plurality of gas recovery nozzles having suction ports that are arranged at different positions to suck the hydrogen-based gas at each height position in the heat-generating element cell 16 and specify the generated gas type. For example, when the heat-generating element cell 16 is provided with three nozzles of an upper recovery nozzle, a middle recovery nozzle, and a lower recovery nozzle suction ports of which differ in height position, the generated gas type specifying unit 25 can specify the type of the generated gas generated at each height position in the heat-generating element cell 16, and determine whether the heat generation reaction occurs at each height position in the heat-generating element cell 16 depending on whether a specific gas is generated by the heat generation reaction. Note that the suction ports may be arranged in lateral positions that are orthogonal to the height positions, in addition to the height positions, in this case, the heat-generating element cell 16 may be provided with a plurality of recovery nozzles having suction ports that are arranged at different positions in a lateral direction.

In the above-described embodiment, the heat-generating element cells 16, 66 may be provided with both of the temperature measurement units 51*a*, 51*b*, 51*c*, 51*d* and the thermoelectric conversion elements 37, 38, 39 so as to measure the temperatures of the inside and outer wall of the container of each of the heat-generating element cells 16, 66.

The above-described embodiment describes the heat generating system 1 provided with the plurality of heat-generating element cells 16, but the present invention is not limited thereto, and may be a heat generating system provided with one heat-generating element cell 16. In this case, the heat generating system includes: the temperature measurement units (the temperature measurement units 51*a*, 51*b*, 51*c*, 51*d* and the thermoelectric conversion elements 37, 38, 39) that measure the temperatures of the inside and/or outer wall of the container of the heat-generating element cell 16; the gas supply control unit 22 that determines the supply position (for example, height position, lateral-directional position, and the like) of the hydrogen-based gas to be supplied into the heat-generating element cell 16 based on the measurement results obtained from the temperature measurement units; and the gas supply change unit 31 that changes the supply position of the hydrogen-based gas to be supplied into the heat-generating element cell 16 to a supply position determined by the gas supply control unit 22.

In such a heat generating system, the supply position of the hydrogen-based gas to be supplied into the heat-generating element cell 16 is properly changed in accordance with a heat generation state of the heat-generating element cell 16 that changes together with the elapse of time so that the excess heat is output, thereby capable of stably obtaining heat using the heat-generating element cell 16 that generates heat using the hydrogen storage metal or the hydrogen storage alloy.

In the above-described embodiment, the heat-generating element cell that generates excess heat using the hydrogen storage metal or the hydrogen storage alloy may be the heat-generating element cell 16 in which a heat-generating element formed in a predetermined shape such as cylindrical net shape, cylindrical shape, and rod shape, for example is provided inside the container, or a heat-generating element cell in which a powdery hydrogen storage metal or a powdery hydrogen storage alloy is enclosed in the inside of the container.

The above-described embodiment describes a case in which the inside of the container of the heat-generating element cell is heated by heating the hydrogen-based gas or the electrolytic solution, but the present invention is not limited thereto, may adjust the temperatures of the heat-generating element cell using various other temperature adjustment units such as a heating heater that are provided in the inside or on the outer wall of the container of the heat-generating element cell.

REFERENCE SIGNS LIST

1, 61 Heat generating system
2 Integrated control unit
9 Output recovery unit
16, 66 Heat-generating element cell
31 Gas supply change unit
37, 38, 39 Thermoelectric conversion element (Temperature measurement unit)
51*a*, 51*b*, 51*c*, 51*d* Temperature measurement unit

What is claimed is:

1. A heat generating system, comprising:
a plurality of heat-generating element cells, each of which is configured to generate heat by hydrogen-based gas, which contributes to heat generation, being supplied therein, wherein each of the heat-generating element cells includes a container and either a hydrogen storage metal or a hydrogen storage alloy that is provided inside the container, and the hydrogen-based gas is introduced to the container;
an integrated control unit that performs a heat generation process by heating each of the heat-generating element cells and supplying the hydrogen-based gas into each of the heat-generating element cells, and makes an output recovery unit recover the heat output from each of the heat-generating element cells; and
a heat-generating element state evaluation unit that evaluates a heat output state of each of the heat-generating element cells based on one of followings so that an evaluation result is created;
  i) an estimation result of a temperature distribution of each of the heat-generating element cells;
  ii) a specific result of a type of generated gas generated in each of the heat-generating element cells;
  iii) an estimation result of a hydrogen storage amount of the hydrogen storage metal or the hydrogen storage alloy in each of the heat-generating element cells;
  iv) an output result of a heat recovered from the hydrogen-based gas discharged from in each of the heat-generating element cells; and
  v) an output result of a heat recovered from an outer wall of the container of each of the heat-generating element cells,
wherein the integrated control unit determines whether or not each of the heat-generating element cells generates an excess heat based on the evaluation result of the heat-generating element state evaluation unit, and next when one of the heat-generating element cells is determined as not generating the excess heat, which is defined as a non-excess heat cell, the integrated control unit continuously performs the heat generation process to the non-excess heat cell, and when another of the heat-generating element cells is determined as generating the excess heat, which is defined as an excess heat cell, the integrated control unit performs an excess heat output process to the excess heat cell, thereby increasing and/or maintaining the excess heat output from the excess heat cell wherein the excess heat output process is selected from one of follows:
a) a temperature adjustment of the excess heat cell,
b) a supply control of the hydrogen-based gas into the excess heat cell, and
c) a pressure control in the excess heat cell.

2. A heat generating system, comprising:
a plurality of heat-generating element cells, each of which is configured to generate heat by hydrogen-based gas, which contributes to heat generation, being supplied therein, wherein each of the heat-generating element cells includes a container and either a hydrogen storage metal or a hydrogen storage alloy that is provided inside the container, and the hydrogen-based gas is introduced to the container;
an integrated control unit that performs a heat generation process by heating each of the heat-generating element cells and supplying the hydrogen-based gas into each of the heat-generating element cells, and makes an output recovery unit recover the heat output from each of the heat-generating element cells; and
a heat-generating element state evaluation unit that evaluates a heat output state of each of the heat-generating element cells based on one of followings so that an evaluation result is created:
  i) an estimation result of a temperature distribution of each of the heat-generating element cells;
  ii) a specific result of a type of generated gas generated in each of the heat-generating element cells;
  iii) an estimation result of a hydrogen storage amount of the hydrogen storage metal or the hydrogen storage alloy in each of the heat-generating element cells;
  iv) an output result of a heat recovered from the hydrogen-based gas discharged from in each of the heat-generating element cells; and
  v) an output result of a heat recovered from an outer wall of the container of each of the heat-generating element cells,
wherein the integrated control unit determines whether or not each of the heat-generating element cells generates an excess heat based on the evaluation result of the heat-generating element state evaluation unit, and next
when one of the heat-generating element cells is determined as generating the excess heat, which is defined as an excess heat cell, the integrated control unit continuously performs the heat generation process to the excess heat cell, and
when another of the heat-generating element cells is determined as not generating the excess heat, which is defined as a non-excess heat cell, the integrated control unit to the non-excess heat cell, thereby promoting the excess heat output from the non-excess heat cell wherein the excess heat output process is selected from one of follows:
a) a temperature adjustment of the non-excess heat cell,
b) a supply control of the hydrogen-based gas into the non-excess heat cell, and
c) a pressure control in the non-excess heat cell.

3. A heat generating system, comprising:
a plurality of heat-generating element cells, each of which is configured to generate heat by an electrolytic solution, which contributes to heat generation being supplied therein, wherein each of the heat-generating element cells includes a container and either a hydrogen storage metal or a hydrogen storage alloy that is provided inside the container, and the electrolytic solution is introduced to the container;
an integrated control unit that performs a heat generation process by heating each of the heat-generating element cells and supplying the electrolytic solution into each of the heat-generating element cells, and makes an output recovery unit recover the heat output from each of the heat-generating element cells; and
a heat-generating element state evaluation unit that evaluates a heat output state of each of the heat-generating element cells based on one of followings so that an evaluation result is created:
  i) an estimation result of a temperature distribution of each of the heat-generating element cells;
  ii) a specific result of a type of generated gas generated in each of the heat-generating element cells;
  iii) an estimation result of a hydrogen storage amount of the hydrogen storage metal or the hydrogen storage alloy in each of the heat-generating element cells;
  iv) an output result of a heat recovered from the electrolytic solution and/or the generated gas discharged from in each of the heat-generating element cells; and
  v) an output result of a heat recovered from an outer wall of the container of each of the heat-generating element cells,
wherein the integrated control unit determines whether or not each of the heat-generating element cells generates an excess heat based on the evaluation result of the heat-generating element state evaluation unit, and next
when one of the heat-generating element cells is determined as not generating the excess heat, which is defined as a non-excess heat cell, the integrated control unit continuously performs the heat generation process to the non-excess heat cell, and
when another of the heat-generating element cells is determined as generating the excess heat, which is defined as an excess heat cell, the integrated control unit performs an excess heat output process to the excess heat cell, thereby increasing and/or maintaining the excess heat output from the excess heat cell wherein the excess heat output process is selected from one of follows:
a) a temperature adjustment of the excess heat cell,
b) a supply control of the electrolytic solution into the excess heat cell, and
c) an electrolytic voltage and current control in the excess heat cell.

4. A heat generating system, comprising:
a plurality of heat-generating element cells, each of which is configured to generate heat by an electrolytic solution, which contributes to heat generation, being supplied therein, wherein each of the heat-generating element cells includes a container and either a hydrogen storage metal or a hydrogen storage alloy that is provided inside the container, and the electrolytic solution is introduced to the container;
an integrated control unit that performs a heat generation process by heating each of the heat-generating element cells and supplying the electrolytic solution into each of the heat-generating element cells, and makes an output recovery unit recover the heat output from each of the heat-generating element cells; and a heat-generating element state evaluation unit that evaluates a heat output state of each of the heat-generating element cells based on one of followings so that an evaluation result is created:
   i) an estimation result of a temperature distribution of each of the heat-generating element cells;
   ii) a specific result of a type of generated gas generated in each of the heat-generating element cells;
   iii) an estimation result of a hydrogen storage amount of the hydrogen storage metal or the hydrogen storage alloy in each of the heat-generating element cells;
   iv) an output result of a heat recovered from the electrolytic solution and/or the generated gas discharged from in each of the heat-generating element cells; and
   v) an output result of a heat recovered from an outer wall of the container of each of the heat-generating element cells,
wherein the integrated control unit determines whether or not each of the heat-generating element cells generates an excess heat based on the evaluation result of the heat-generating element state evaluation unit, and next when one of the heat-generating element cells is determined as generating the excess heat, which is defined as an excess heat cell, the integrated control unit continuously performs the heat generation process to the excess heat cell, and when another of the heat-generating element cells is determined as not generating the excess heat, which is defined as a non-excess heat cell, the integrated control unit performs an excess heat output process to the non-excess heat cell, thereby promoting the excess heat output from the non-excess heat cell wherein the excess heat output process is selected from one of follows:
   a) a temperature adjustment of the non-excess heat cell,
   b) a supply control of the electrolytic solution into the non-excess heat cell, and
   c) an electrolytic voltage and current control in the non-excess heat cell.

5. The heat generating system according to claim 1, further comprising:
   a plurality of supply nozzles having a supply ports that are arranged at different positions in each of the heat-generating element cells; and
   a gas supply change unit provided to each of the supply nozzles that changes a supply position of the hydrogen-based gas when the hydrogen-based gas is supplied into each of the heat-generating element cells, wherein
   the integrated control unit makes the gas supply change unit change the supply position of the hydrogen-based gas to be supplied into each of the heat-generating element cells when performing the excess heat output process.

6. The heat generating system according to claim 1, further comprising:
   a circulating passage provided to be wound around an outer wall of the container of each of the heat-generating element cells, the circulating passage configured to flow a thermal fluid, wherein
   the output recovery unit recovers heat generated from the outer wall of the container of each of the heat-generating element cells through the thermal fluid, and recovers heat from the hydrogen-based gas discharged from an inside of each of the heat-generating element cells.

7. The heat generating system according to claim 3, further comprising:
   a circulating passage provided to be wound around an outer wall of the container of each of the heat-generating element cells, the circulating passage configured to flow a thermal fluid, wherein
   the output recovery unit recovers heat generated from the outer wall of the container of each of the heat-generating element cells through the thermal fluid, and recovers heat from the electrolytic solution and/or generated gas discharged from an inside of the each of the heat-generating element cells.

8. The heat generating system according to claim 1, further comprising:
   a plurality of temperature measurement units that arranged in an array form along an outer wall of the container of each of the heat-generating element cells, and the temperature measurement units measuring temperatures of at different positions on each of the heat-generating element cells, wherein
   the heat-generating element state evaluation unit evaluates the heat output state of each of the heat-generating element cells based on the estimation result of the temperature distribution, and
   the temperature distribution is obtained from the temperatures at different positions, which are measured with the temperature measurement units.

9. The heat generating system according to claim 1, wherein
   each of the heat-generating element cells is provided with a hydrogen storage amount estimation unit that estimates a hydrogen storage amount of the hydrogen storage metal or the hydrogen storage alloy in the heat-generating element cell, and
   the integrated control unit determines whether each of the heat-generating element cells generates the excess heat based on an estimation result from the hydrogen storage amount estimation unit.

10. The heat generating system according to claim 1, further comprising:
    a circulating passage provided to be wound around an outer wall of the container of each of the heat-generating element cells, the circulating passage configured to flow a thermal fluid in contact with the outer wall of the container of each of the heat-generating element cells, and
    a thermal fluid circulation unit circulates the thermal fluid flows through the circulating passage, and recovers heat generated from each of the heat-generating element cells through the thermal fluid, wherein
    the integrated control unit increases a flow velocity of the thermal fluid that flows in contact with the outer wall of the container of the heat excess cell so as to be faster than that of the thermal fluid that flows in contact with the outer wall of the container of the non-excess heat cell to increase a recovery rate of heat from the thermal fluid in the excess heat cell.

11. A heat generating system, comprising:
    a heat-generating element cell that generates heat using a hydrogen storage metal or a hydrogen storage alloy when hydrogen-based gas contributing to heat generation is supplied into the heat-generating element cell;
    a temperature measurement unit that is provided to the heat-generating element cell, and measures temperatures of an inside and/or an outer wall of a container of the heat-generating element cell;

a gas supply control unit that determines a supply position of the hydrogen-based gas to be supplied into the heat-generating element cell based on a measurement result obtained from the temperature measurement unit;

a plurality of supply nozzles having a supply ports that are arranged at different positions in the heat-generating element cell; and a gas supply change unit provided to each of the supply nozzles that changes a supply position of the hydrogen-based gas to be supplied into the heat generating element cell to a supply position determined by the gas supply control unit, wherein an excess heat generating position at which excess heat is generated in the heat-generating element cell is specified based on the measurement result obtained from the temperature measurement unit, and it is determined that a supply position of the hydrogen-based gas is supplied around the excess heat generating position in the heat-generating element cell.

* * * * *